United States Patent
Brown et al.

(10) Patent No.: US 7,179,531 B2
(45) Date of Patent: Feb. 20, 2007

(54) POLYMER PARTICLES HAVING SELECT PENDANT GROUPS AND COMPOSITION PREPARED THEREFROM

(75) Inventors: Ward Thomas Brown, North Wales, PA (US); James Keith Bardman, Green Lane, PA (US)

(73) Assignee: Rohm and Haas Company, Philadelphia, PA (US)

( * ) Notice: Subject to any disclaimer, the term of this patent is extended or adjusted under 35 U.S.C. 154(b) by 419 days.

(21) Appl. No.: 10/642,791

(22) Filed: Aug. 18, 2003

(65) Prior Publication Data

US 2004/0054063 A1    Mar. 18, 2004

Related U.S. Application Data

(60) Provisional application No. 60/410,075, filed on Sep. 12, 2002.

(51) Int. Cl.
*B32B 5/16* (2006.01)

(52) U.S. Cl. .................................. 428/407; 524/458

(58) Field of Classification Search ................ 428/402, 428/407, 403; 524/458, 425
See application file for complete search history.

(56) References Cited

U.S. PATENT DOCUMENTS

| | | | | |
|---|---|---|---|---|
| 4,658,003 A | * | 4/1987 | Schmidt et al. .............. | 526/278 |
| 4,791,151 A | | 12/1988 | Chou et al. | |
| 4,997,864 A | | 3/1991 | Waters ........................ | 523/319 |
| 5,110,358 A | * | 5/1992 | Mongoin et al. ............. | 106/462 |
| 5,145,902 A | * | 9/1992 | Ravet et al. .................. | 524/425 |
| 5,147,506 A | * | 9/1992 | Mongoin et al. ............ | 162/135 |
| 5,191,029 A | * | 3/1993 | DelDonno .................... | 525/366 |
| 5,210,113 A | | 5/1993 | Waters ........................ | 523/205 |
| 5,296,524 A | | 3/1994 | Waters ........................ | 523/319 |
| 5,324,879 A | | 6/1994 | Hawthorne .................. | 585/511 |
| 5,344,675 A | | 9/1994 | Snyder | |
| 5,362,826 A | | 11/1994 | Berge et al. ................. | 526/194 |
| 5,385,960 A | | 1/1995 | Emmons et al. ............. | 523/205 |
| 5,412,019 A | | 5/1995 | Roulstone et al. ........... | 524/497 |
| 5,509,960 A | | 4/1996 | Simpson et al. ............. | 106/437 |
| 5,534,585 A | | 7/1996 | Roulstone et al. ........... | 524/497 |
| 5,554,215 A | | 9/1996 | Simpson et al. ............. | 106/436 |
| 5,643,974 A | | 7/1997 | Simpson et al. ............. | 523/334 |
| 5,663,224 A | * | 9/1997 | Emmons et al. ............. | 524/188 |
| 5,710,227 A | | 1/1998 | Freeman et al. ............. | 526/208 |
| 5,869,559 A | | 2/1999 | Simpson et al. ............. | 524/497 |
| 5,889,088 A | | 3/1999 | Kisuno et al. ............... | 523/205 |
| 5,952,404 A | | 9/1999 | Simpson et al. ............. | 523/221 |
| 6,080,802 A | * | 6/2000 | Emmons et al. ............. | 523/205 |
| 6,291,575 B2 | * | 9/2001 | Yukawa et al. .............. | 524/521 |
| 6,528,567 B1 | | 3/2003 | Arai et al. | |
| 6,576,051 B2 | * | 6/2003 | Bardman et al. ............ | 106/436 |
| 6,740,173 B1 | * | 5/2004 | Pouyfaucon et al. ........ | 148/250 |
| 2002/0058749 A1 | | 5/2002 | Larson et al. | |
| 2002/0096088 A1 | | 7/2002 | Bardman et al. | |
| 2003/0017348 A1 | | 1/2003 | Brown et al. | |
| 2003/0018103 A1 | | 1/2003 | Bardman et al. | |

FOREIGN PATENT DOCUMENTS

| | | |
|---|---|---|
| EP | 0359562 A | 3/1990 |
| EP | 0 376 591 B1 | 8/1995 |
| EP | 1179564 A | 2/2002 |
| EP | 1193298 A | 4/2002 |
| EP | 1209191 A | 5/2002 |
| WO | WO 99/25780 | 5/1999 |
| WO | WO 01/74826 A1 | 10/2001 |

OTHER PUBLICATIONS

U.S. Appl. No. 60/485,411, filed Jul. 28, 2003, Brown et al.
U.S. Appl. No. 60/435,013, filed Dec. 19, 2002, Brown et al.

* cited by examiner

*Primary Examiner*—H. Thi Le
(74) *Attorney, Agent, or Firm*—Kim R. Jessum; Gary D. Greenblatt

(57) ABSTRACT

Polymer particles having select functional or absorbing groups are provided. The polymer particles are useful for preparing organic-inorganic composite particles that are suitable for providing dried coatings with improved hiding. Aqueous compositions containing these composite particles are also provided. The select absorbing groups include phosphorus acid groups, phosphorus acid full-ester groups, polyacid sidechain groups, and salts thereof. The select functional groups are capable of forming covalently bonded composite particles. The composite particles formed from the multistage polymer particles having the select functional or absorbing groups are useful for preparing dried coatings with a combination of improved hiding, increased gloss, and good film properties.

9 Claims, No Drawings

POLYMER PARTICLES HAVING SELECT PENDANT GROUPS AND COMPOSITION PREPARED THEREFROM

CROSS REFERENCE TO RELATED PATENT APPLICATIONS

This is a non-provisional application of prior U.S. provisional application Ser. No. 60/410,075 filed Sep. 12, 2002 now abandoned.

This invention relates to polymer particles having select absorbing or functional groups. In particular, the polymer particles are useful for preparing composite particles, which are organic-inorganic particles containing an inorganic particle having a plurality of the polymer particles attached thereto. The invention further relates to the composite particle and to an aqueous composition containing the composite particle, which is suitable for preparing dried coatings. The incorporation of the polymer particles into coating compositions as components of composite particles allows the preparation of coatings having improved hiding and good film properties.

Opacifying pigments provide whiteness, and opacity or "hiding", to opacifying coatings, such as paints. These pigments are present in all coatings that are designed to provide an opaque coating on and concealingly cover an undersurface or substrate surface to which the coating is applied. Opacifying pigments are absent from those coatings that are designed to be clear or transparent. Opacifying pigments are present in opacifying coatings, especially paints. In most paints, the opacifying pigment is present irrespective of whether the paint is white or colored. The opacifying pigment of most paints is distinguished from the color specific pigments, also known as tinting agents or colorants, which are additionally present in colored paints. It is the color specific pigments that provide the specific color or tint to non-white paints.

It is desirable that opacifying coatings and paints have a high opacifying capacity so as to enable the coating or paint to completely conceal the undersurface, even if of a sharply contrasting color, while utilizing a minimal application of the coating or paint. It is highly desirable that complete covering of the undersurface is attained with a single application of the coating or paint, having the minimum possible thickness.

Opacifying coating and paint manufacturers have long sought to formulate opacifying coatings and paints having the desired opacity by maximizing the level of hiding for a defined level of opacifying pigment, in order to minimize the amount of opacifying pigment utilized.

The opacifying capacity or hiding power of an opacifying coating or paint is a measure of the coating's ability to conceal a surface to which the coating is applied. Opacifying capacity is a function of the spacing between the particles of opacifying pigment in the dried applied coating. Opacifying capacity of a coating is maximized when the light scattering capability of the opacifying pigment is maximized. Maximum light scattering efficiency occurs when the opacifying pigment particles have a certain diameter and spacing, so that the light scattering capability of each particle does not interfere with the light scattering capability of its neighboring particles. This condition may occur in coatings containing sufficiently low levels of opacifying pigment such that the individual opacifying pigment particles are isolated from each other. Coatings containing such low levels of opacifying pigment, however, do not provide sufficient whiteness and hiding at typical dried coating thicknesses. Achieving the desired levels of hiding and whiteness typically requires higher levels of opacifying pigment. At these higher levels, a statistical distribution of opacifying pigment particles occurs, which results in at least some of the opacifying pigment particles being in such close proximity to one another that there is a loss of light scattering efficiency due to crowding of the opacifying pigment particles.

Increased hiding efficiency is obtained by reducing the crowding of the opacifying pigment particles and minimizing the formation of clusters of opacifying pigment particles. One method uses polymer particles containing select chemical groups which promote adsorption to the opacifying pigment particle.

For example, U.S. Pat. No. 5,385,960 discloses an aqueous dispersion of composite particles, the composite particles each including a plurality of selected polymeric latex particles adsorbed to a titanium dioxide opacifying pigment particle. The selected polymeric latex particles have dihydrogen phosphate functional groups, which promote adsorption of the selected polymeric latex particles onto the surface of the titanium dioxide particles.

Although these composite particles provide improved hiding, there is still a need to provide aqueous compositions suitable for preparing dried coatings having a combination of increased hiding and film properties such as resistance to scrubbing. Other desired properties for the dried coatings include increased gloss and whiteness. One parameter influencing film properties, particularly in aqueous compositions containing polymer particles as the binder, is the film formation step. Film formation is the process wherein the binder polymer particles coalesce to form a continuous polymer matrix or film. Desired are aqueous compositions suitable for preparing dried coatings that have improved hiding, a suitable level of resistance to scrubbing, and optionally, increased gloss or whiteness. Further, it is desired that these aqueous compositions contain low levels of volatile organic compounds (VOCs) or preferably, are formulated without volatile organic compounds.

The present invention provides polymer particles useful for preparing dried coatings having improved properties, such as increase hiding, increase whiteness, or increased gloss. The dried coatings are characterized as containing organic-inorganic composite particles including the polymer particles of this invention. An advantage of the present polymer particles is that for a desired level of hiding, these dried coatings contain lower levels of pigment and/or are applied at lower coating weights than coatings previously known in the art. Further, the use of the polymer particles of the present invention allows the preparation of dried coatings having acceptable scrub resistance. The dried coating are alternatively prepared with low levels or even in the absence of volatile organic compounds.

According to the first aspect of the present invention, a polymer composition is provided containing multistage polymer particles; wherein each of the multistage polymer particles contains: a) a first polymer containing: a polymerized unit of a multiethylenically unsaturated monomer, and ii) a pendant absorbing group selected from phosphorus acid groups, phosphorus acid full-ester groups, polyacid sidechain groups, and mixtures thereof, wherein the first polymer has a glass transition temperature in the range of from −60° C. to 35° C.; and a second polymer having a glass transition temperature in the range of from −60° C. to 35° C., wherein the second polymer is substantially free of the at least one pendant absorbing group; wherein the average weight ratio of the first polymer to the second polymer is in the range of from 1:2 to 1:20.

A second aspect of the present invention provides a composite particle including an inorganic particle having a surface; and a plurality of multistage polymer particles attached to the surface of the inorganic particle, each of the multistage polymer particles having a first polymer containing a polymerized unit of a multiethylenically unsaturated monomer, and at least one pendant absorbing group selected from phosphorus acid groups, phosphorus acid full-ester groups, polyacid sidechain groups, and mixtures thereof, wherein the first polymer has a glass transition temperature in the range of from −60° C. to 35° C.; and a second polymer having a glass transition temperature in the range of from −60° C. to 35° C., wherein the second polymer is substantially free of the at least one pendant absorbing group; and wherein the average weight ratio of the first polymer to the second polymer is in the range of from 1:2 to 1:20.

A third aspect of the present invention provides an aqueous composition, useful for preparing a dried coating, including a composite particle containing an inorganic particle having a surface; and a plurality of multistage polymer particles attached to the surface of the inorganic particle, each of the multistage polymer particles having a first polymer containing as a polymerized unit of a multiethylenically unsaturated monomer, and at least one pendant absorbing group selected from phosphorus acid groups, phosphorus acid full-ester groups, polyacid sidechain groups, and mixtures thereof, wherein the first polymer has a glass transition temperature in the range of from −60° C. to 35° C.; and a second polymer having a glass transition temperature in the range of from −60° C. to 35° C., wherein the second polymer is substantially free of the at least one pendant absorbing group; wherein the average weight ratio of the first polymer to the second polymer is in the range of from 1:2 to 1:20; and a binder.

The first, second, and third aspects of this invention relate, respectively, to a polymer composition containing multistage polymer particles having select pendant absorbing groups, a composite particle containing the multistage polymer particles having select pendant absorbing groups, and an aqueous composition containing these composite particles, which is useful for preparing a dried coating from the aqueous composition.

A fourth aspect of the present invention provides a multistage polymer particle including a first polymer having a polymerized unit of a multiethylenically unsaturated monomer, and a complementary functional group, wherein the first polymer has a glass transition temperature in the range of from −60° C. to 120° C.; and a second polymer having a glass transition temperature in the range of from −60° C. to 35° C., wherein the second polymer is substantially free of the at least one complementary functional group; wherein the average weight ratio of the first polymer to the second polymer is in the range of from 1:2 to 1:20.

A fifth aspect of the present invention provides a covalently bonded composite particle including a pigment particle; a first plurality of reacted coupling agents, such that each one of the reacted coupling agents forms a first covalent bond to the pigment particle; and a second plurality of multistage polymer particles, each of the multistage polymer particles including a first polymer containing a polymerized unit of a multiethylenically unsaturated monomer, and a complementary functional group reacted to form a second covalent bond with a corresponding one of the first plurality of reacted coupling agents; wherein the first polymer has a glass transition temperature in the range of from −60° C. to 120° C.; and a second polymer having a glass transition temperature in the range of from −60° C. to 35° C., wherein the second polymer is substantially free of the reacted complementary functional group; and wherein the average weight ratio of the first polymer to the second polymer is in the range of from 1:2 to 1:20.

A sixth aspect of the present invention provides an aqueous composition, useful for preparing a dried coating, including a covalently bonded composite particle containing a pigment particle; a first plurality of reacted coupling agents, such that each one of the reacted coupling agents forms a first covalent bond with the pigment particle; and a second plurality of multistage polymer particles, each of the multistage polymer particles containing a first polymer having a polymerized unit of a multiethylenically unsaturated monomer, and a complementary functional group reacted to form a second covalent bond with a corresponding one of the first plurality of reacted coupling agents; wherein the first polymer has a glass transition temperature in the range of from −60° C. to 120° C.; and a second polymer having a glass transition temperature in the range of from −60° C. to 35° C., wherein the second polymer is substantially free of the reacted complementary functional group; wherein the average weight ratio of the first polymer to the second polymer is in the range of from 1:2 to 1:20; and a binder.

The fourth, fifth, and sixth aspects of this invention relate, respectively, to a multistage polymer particle having a complementary functional group, a covalently bonded composite particle prepared from the multistage polymer particle having a complementary group; and an aqueous composition containing the covalently bonded composite particles, which is useful for preparing a dried coating from the aqueous composition containing the covalently bonded composite particles.

According to the seventh aspect of the present invention, an aqueous composition is provided containing polymer particles dispersed in an aqueous medium; wherein the polymer particles have pendant phosphorus acid full-ester groups.

An eighth aspect of the present invention provides a composite particle including an inorganic particle having a surface; and a plurality of polymer particles absorbed on the surface of the inorganic particle, each of the polymer particles having a pendant phosphorus acid full-ester group.

The aqueous composition of the seventh aspect of this invention is suitable for the preparing the composite particles of the eighth aspect.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; and the term "(meth)acrylamide" refers to either acrylamide or methacrylamide. "Glass transition temperature" or "$T_g$" as used herein, means the temperature at or above which a glassy polymer undergoes segmental motion of the polymer chain. Glass transition temperatures of a polymer are estimated by the Fox equation [*Bulletin of the American Physical Society* 1, 3 Page 123 (1956)], as follows:

$$\frac{1}{T_g} = \frac{w_1}{T_{g(1)}} + \frac{w_2}{T_{g(2)}}$$

For a copolymer, $w_1$ and $w_2$ are the weight fraction of the two co-monomers, and $T_{g(1)}$ and $T_{g(2)}$ are the glass transition temperatures, in degrees Kelvin, of the two corresponding homopolymers. For polymers containing three or more monomers, additional terms ($w_n/T_{g(n)}$) are added. Alternatively, the $T_g$ of a polymer phase is calculated by using the appropriate values for the glass transition temperatures of homopolymers, which are found, for example, in "Polymer Handbook", edited by J. Brandrup and E. H. Immergut, Interscience Publishers. The values of $T_g$ reported herein are calculated based on the Fox equation.

As used herein, the term "covalent bond" refers to a bond between two atoms formed by sharing at least one pair of electrons and expressly excludes ionic bonds, hydrogen bonds, bonds formed by adsorption including chemical adsorption and physical adsorption, bonds formed from van der Waals bonds, and dispersion forces.

As used herein, the term "phosphorus acid group" refers to a phosphorus oxo acid having a POH moiety in which the hydrogen atom is ionizable or to the salt of the phosphorus oxo acid. In its salt or basic form, the phosphorus acid group has a metal ion or an ammonium ion replacing at least one acid proton. Included in the definition of the term "phosphorus acid group" are partial esters of phosphorus oxo acids. The partial esters of phosphorus oxo acids, as referred to "partial esters of phosphorus acid" contain at least one POH moiety and a phosphorus ester moiety represented by POR, where R is a group containing a carbon atom bonded to the oxygen atom attached to the phosphorus atom. Examples of phosphorus acid groups include groups formed from phosphinic acid, phosphonic acid, phosphoric acid, pyrophosphinic acid, pyrophosphoric acid, partial esters thereof, and salts thereof.

As used herein, the term "phosphorus acid full-ester group" refers to a phosphorus oxo acid having one or more phosphorus acid moieties, but not containing a POH moiety. Examples of phosphorus acid full-ester groups include full esters of phosphinic acid, phosphonic acid, phosphoric acid, pyrophosphinic acid, and pyrophosphoric acid.

The present invention is directed towards polymer particles useful for preparing coatings having improved hiding, gloss, and whiteness. Further, the coating compositions containing the polymer particles have good film formation properties as indicated by acceptable levels of scrub resistance.

The polymer particles of the present invention are addition polymers formed by the polymerization of ethylenically unsaturated monomers. The polymer particles are further characterized as containing select pendant groups. The select pendant groups are complementary functional groups capable of reacting with other functional groups to form covalent bonds; and alternatively select absorbing groups capable of attaching to surfaces of inorganic particles. Typically, the polymer particles are formed by aqueous emulsion or suspension polymerization of at least one ethylenically unsaturated monomer containing the select pendant group, optionally an ethylenically unsaturated second monomer, and optionally multiethylenically unsaturated monomer.

Suitable ethylenically unsaturated second monomers, referred to herein as "second monomers", include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$–$C_{40}$ alkyl esters of (meth)acrylic acid; for example, methyl (meth)acrylate, ethyl (meth)acrylate, n-butyl (meth)acrylate, 2-ethylhexyl (meth)acrylate, cyclohexyl (meth)acrylate, n-octyl (meth) acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth) acrylate; other (meth)acrylates such as isobornyl (meth) acrylate, benzyl (meth)acrylate, phenyl (meth)acrylate, and 2-bromoethyl (meth)acrylate, alkoxyalkyl (meth)acrylate, such as ethoxyethyl (meth)acrylate, mono-, di-, trialkyl esters of ethylenically unsaturated di- and tricarboxylic acids and anhydrides, such as ethyl maleate, dimethyl fumarate, and ethyl methyl itaconate; and carboxylic acid containing monomers, such as (meth)acrylic acid, itaconic acid, fumaric acid, and maleic acid.

Other suitable monomers for preparing the polymer particles include multi-ethylenically unsaturated monomers, which are effective for raising the molecular weight and crosslinking the polymer particle. Examples of multi-ethylenically unsaturated monomers include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, divinyl naphthalene, and diesters or triesters of phosphoric acid wherein each ester group is ethylenically unsaturated, such as phosphodi(ethyl methacrylate), which has the structure $[CH_2=C(CH_3)C(O)OCH_2CH_2]_2P(O)OH$.

According to the seventh aspect of the invention, an aqueous composition is provided containing polymer particles having pendant phosphorus acid full-ester groups as the select pendant group. Examples of phosphorus acid full-ester groups include monoesters, diesters, and triesters of phosphorus acids. These polymer are useful in coating compositions for preparing dried coatings having improved hiding or improved adhesion to glass, and in coating compositions applied to metal substrates.

The polymer particles having a pendant phosphorus acid full-ester group are addition polymers, typically prepared by the polymerization of ethylenically unsaturated monomers including at least one phosphorus acid full-ester monomer and optionally, at least one second monomer.

The phosphorus acid full-ester monomer contains at least one ethylenic unsaturation and at least one ester of phosphorus acid, but does not contain a phosphorus acid group having an ionizable hydrogen atom or the salt thereof. Examples of phosphorus acid full-ester monomers include:

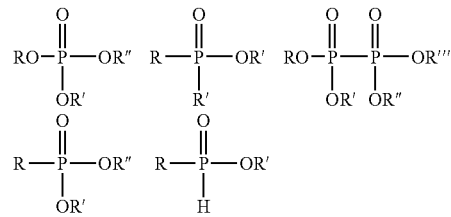

wherein R is an ethylenically unsaturated organic group such as an acryloxy, methacryloxy, or a vinyl group; and R', R", and R''' are independently selected from a second organic group. The second organic group is alternatively saturated or unsaturated.

Suitable phosphorus acid full-ester monomers include trivinyl phosphate; (2-methacryoloxy)ethyl-diethyl-phosphate; di(4-methacryloloxy)butyl-methyl-phosphate; vinyl phosphonic acid, diethyl ester; and glycerol monoacrylate, di(diethylphosphate)ester.

Suitable levels of the phosphorus acid full-ester monomer contained as polymerized units in the polymer particles include from 0.1 weight % to 20 weight %, preferably from 0.5 to 15 weight %, and more preferably from 1 to 10 weight %, based on the weight of the polymer particles. Polymer particles containing phosphorus acid full-ester groups, which are suitable for the preparation of coating compositions, include polymers having a glass transition temperature in the range of −20° C. to 100° C. An aqueous dispersion containing the polymer particles having phosphorus acid full-ester groups typically has a pH in the range of 3 to 10. The average diameter of the polymer particles is typically in the range of 10 nanometer (nm) to 1 micron, preferably in the range of from 20 nm to 700 nm, and more preferably in the range of from 60 nm to 500 nm. The average diameter of the polymer particles is measured by a quasi-elastic light scattering technique.

The polymer particles having phosphorus acid full-ester groups are prepared by any process which provides polymerization of ethylenically unsaturated monomers having phosphorus acid full-ester groups. Suitable processes include suspension or emulsion polymerization, including for example, the processes disclosed in U.S. Pat. No. 5,356,968 and U.S. Pat. No. 5,264,530. An alternate process to prepare the polymer particles is solution polymerization followed by the conversion of the solution polymer to polymer particles by various methods known in the art. Suitable polymerization processes, which include emulsion polymerization, solution polymerization, and suspension polymerization processes, are typically conducted as batch, semicontinuous, or continuous processes.

Preferably, the polymer particles having phosphorus acid full-ester groups are prepared by aqueous emulsion polymerization. Temperatures suitable for aqueous emulsion polymerization processes are in the range of from 20° C. to less than 100° C., preferably in the range of from 40° C. to 95° C., and more preferably in the range of from 50° C. to 90° C.

The emulsion polymerization process optionally employs a seed polymer emulsion to control the number of particles produced by the polymerization, as is known in the art. Suitable seed polymer emulsions include polymer emulsions having average particle diameters in the range of from 10 nm to 60 nm. Alternatively, the seed polymer particles are prepared by adding an initial quantity of a monomer emulsion to the aqueous reaction medium and polymerizing the added monomer. A technique to control the particle size of the polymer particles is by adjusting the initial surfactant charge, as is known in the art.

A polymerization initiator is typically added to the aqueous reaction medium to initiate polymerization of the ethylenically unsaturated monomers. The polymerization initiator can be added at any time, prior to the addition of the phosphorus acid monomer, after the addition of the phosphorus acid monomer, and during the addition of the phosphorus acid monomer. Examples of suitable polymerization initiators include polymerization initiators that thermally decompose at the polymerization temperature to generate free radicals. Examples include both water-soluble and water-insoluble species. Polymerization initiators are used alone, and alternatively, as the oxidizing component of a redox system, which also includes a reducing component. Examples of redox catalyst systems include t-butyl hydroperoxide/sodium formaldehyde sulfoxylate/Fe(II), and ammonium persulfate/sodium bisulfite/sodium hydrosulfite/Fe(II).

Chain transfer agents are optionally added to the aqueous reaction medium to control molecular weight of the polymer particle. Examples of chain transfer agents include mercaptans, polymercaptans, and polyhalogen compounds. Examples of suitable chain transfer agents include alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to 10% by weight, based on the weight of the monomers in the monomer mixture, is used to prepare the polymer particles. Other techniques for controlling molecular weight, known in the art, include selecting the ratio of the initiator to total monomer amount.

Catalyst and/or chain transfer agent are optionally dissolved or dispersed in separate or the same fluid medium, and gradually added to the polymerization vessel. Monomer, either neat, dissolved, or dispersed in a fluid medium, is optionally added simultaneously with the catalyst and/or the chain transfer agent. Amounts of initiator and/or catalyst are optionally added to the aqueous reaction medium to "chase" residual monomer after polymerization has been substantially completed, so as to polymerize the residual monomer, as is well known in the polymerization arts.

The aqueous reaction medium typically contains surfactant to stabilize the growing polymer particles during polymerization and to discourage aggregation of the polymer particles in the resulting aqueous polymer dispersion. One or more surfactants, including anionic and nonionic surfactants, and mixtures thereof, is commonly used. Many examples of surfactants suitable for emulsion polymerization are given in *McCutcheon's Detergents and Emulsifiers* (MC Publishing Co. Glen Rock, NF), published annually. Other types of stabilizing agents, such as protective colloids, are optionally used. However, it is preferred that the amount and type of stabilizing surfactant or other type of stabilizing agent employed during the polymerization reaction be selected so that residual stabilizing agent in the resulting aqueous polymer dispersion does not significantly interfere with the properties of the aqueous polymer dispersion, the properties of compositions including the aqueous polymer dispersion, or articles prepared from the aqueous polymer dispersion.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units. Suitable nonionic surfactants include, for example, alkyl phenoxypolyethoxy ethanols having alkyl groups of from 7 to 18 carbon atoms and from 6 to 60 oxyethylene units, such as, for example, heptyl phenoxypolyethoxyethanols; ethylene oxide derivatives of long chained carboxylic acids, such as lauric acid, myristic acid, palmitic acid, oleic acid, or mixtures of acids, such as those found in tall oil, containing from 6 to 60 oxyethylene units; ethylene oxide condensates of long chained alcohols such as octyl, decyl, lauryl, or cetyl alcohols, containing from 6 to 60 oxyethylene units; ethylene oxide condensates of long chain or branched chain amines, such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers, such as hydroxyethyl cellulose, methyl cellulose, and polyvinyl alcohol, are also usable.

The first and the fourth aspects of the invention provide compositions containing a polymer particle that is a multistage polymer particle containing at least two different polymers. One polymer component of the multistage polymer particle is a first polymer having select functional or absorbing groups. The first polymer also contains as a polymerized unit, at least one multiethylenically unsaturated monomer. The second polymer component of the multistage polymer particle is a second polymer that is substantially free of the select functional or absorbing groups. The select functional or absorbing groups are suitable for attaching the multistage polymer to the surface of an inorganic particle to prepare organic-inorganic composite particles. These composite particles are characterized by a single inorganic particle surrounded by a plurality of multistage polymer particles. Aqueous composition containing these composite particles have good stability. Further, coating compositions including these composite particles provide dried films having improved film formation, and increased hiding, gloss, or whiteness.

While not intending to be bound by a particular theory, the inventors believe that the multistage polymer particle of this invention contains the first polymer as a separate polymer phase that is distinct from the second polymer. Further, the polymer phase constituting the first polymer is not totally encapsulated by the second polymer, and as such, has the select functional groups or absorbing groups at or near the outer surface of the multistage polymer particle. However, since the first polymer is partially encapsulated by the second polymer, the select functional groups or absorbing groups are localized to one region of the surface area of the multistage polymer particle formed by the first polymer. The remaining surface area of the multistage polymer particle, which is formed by the second polymer, is characterized as being substantially free or completely free of the select functional groups or absorbing groups. The multiphase polymer particle can be envisioned as having a surface divided between a single "active" region, which has groups that are capable of attaching to an inorganic particle; and an "inactive" region, which is substantially free of the requisite groups needed to attach to an inorganic particle. Thus, it is believed that the multistage polymer particle is capable of attaching to only one inorganic particle since the functional or absorbing groups of the first polymer are localized to a single surface area of the multistage polymer particle. Further, the "inactive region", formed by the surface of second polymer component of the multistage particle effectively blocks attachment to a second inorganic particle, thus minimizing the formation of clusters of inorganic particles. An example of such a multistage particle is a particle having a morphology of a core polymer partially encapsulated by a shell polymer, often referred to as an "acorn" particle.

The multistage polymer particle has an average weight ratio of the first polymer to the second polymer in the range of from 1:2 to 1:20. Preferably, the lower limit for the weight ratio of the first polymer to the second polymer is 1:4, and more preferably, 1:6. Preferably, the upper limit for the weight ratio for the first polymer to the second polymer is in the range 1:18, and more preferably, 1:15.

The first polymer has a glass transition temperature in the range of from −60° C. to 120° C. Preferably the glass transition temperature of the first polymer is at least −40° C. and more preferably, at least −25° C. The glass transition temperature of the first polymer is preferably 40° C. or less, more preferably, 30° C. and less, and most preferably, 25° C. and less.

The second polymer has a glass transition temperature in the range of from −60° C. to 35° C. Preferably the glass transition temperature of the second polymer is at least −40° C. and more preferably, at least −25° C. The glass transition temperature of the second polymer is preferably 30° C. or less, and more preferably, 25° C. and less.

The weight average molecular weight of the first polymer is typically in the range of at least 100,000, more preferably at least 200,000, and most preferably, at least 250,000. The weight average molecular weight of the second polymer is typically in the range of 10,000 to 5,000,000, preferably in the range of 50,000 to 2,000,000, and more preferably in the range of 100,000 to 1,000,000. The weight average molecular weights of the first polymer and the second polymer are determined by preparing the polymer in the absence of the other polymer and measuring the weight average molecular weight using gel permeation chromatography.

The multistage polymer particles generally have an average particle diameter in the range of from 40 nm to 1 micron, preferably in the range of from 60 nm to 500 nm, and more preferably in the range of from 80 nm to 200 nm.

The first polymer and the second polymer are formed by the polymerization of ethylenically unsaturated monomers employing a sequential polymerization process, such as aqueous emulsion polymerization. One method to prepare the first polymer is polymerization of a monomer mixture including ethylenically unsaturated monomer containing the select functional group or absorbing group, a multiethylenically unsaturated monomer, and optionally other second monomers. The second polymer is polymerized from a monomer mixture containing second monomers but is substantially free of monomer containing the select functional group or absorbing group that is incorporated into the first polymer.

In the first aspect of the present invention, the multistage polymer particle contains at least one select absorbing group selected from phosphorus acid groups, phosphorus acid full-ester groups, or polyacid sidechain groups.

Polyacid sidechain groups are branches to the polymer backbone that contain at least four units of polymerized ethylenically unsaturated monomer, wherein at least half of the polymerized monomer units have an acid group pendant to the polymer sidechain. Suitable acid groups include carboxylic acids and phosphorus acids. As used herein, the definitions of phosphorus acid groups and polyacid sidechain groups include salts of these acids. Suitable salts include ammonium salts, alkali metal salts such as sodium and potassium salts, and salts formed from organic bases such as diethanol amine and triethanol amine.

The polyacid sidechain groups are incorporated into the first polymer by polymerization of an acid macromonomer. As used herein, acid macromonomer refers to an oligomer with a terminal unsaturation and having monomers with acid groups as polymerized units. The terminal unsaturation and the section of the acid macromonomer with the acid groups are attached directly or alternatively, attached through a linker group. Suitable acid macromonomers are:

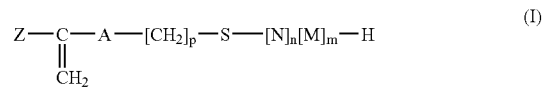

(I)

-continued

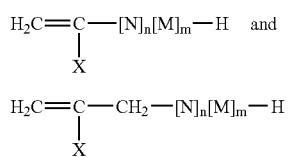

wherein N is the residue of an ethylenically unsaturated carboxylic acid monomer and has the formula:

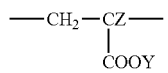

wherein M is the residue of a second ethylenically unsaturated monomer and has the formula

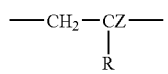

wherein the N and M residues are randomly arranged in the acid macromonomer; wherein m is the total number of M residues in the acid macromonomer and is in the range of 0 to 150; wherein n is the total number of N residues in the acid macromonomer and is in the range of 4 to 300; wherein n is greater than or equal to m; wherein the sum of n and m is in the range of 4 to 300; wherein A is a linker group selected from ester, urethane, amide, amine, and ether linkages; wherein p is in the range of 1 to 20; wherein X is selected from —COOY and R; wherein R is selected from phenyl radicals, substituted phenyl radicals, —CONH$_2$, —CONHR', —CONR'R', —CN, —CCOR', —OCOR', —Cl, and mixtures thereof, wherein R' is an alkyl or alkoxyalkyl radical independently selected from branched, unbranched, or cyclic hydrocarbon radicals having 1 to 18 carbon atoms; wherein Y is independently selected from H, NH$_4$, alkali metals and alkaline earth metals; and wherein each Z is independently selected from H and CH$_3$.

One method to prepare the acid macromonomers is polymerization of at least one ethylenically unsaturated carboxylic acid monomer and optionally at least one second ethylenically unsaturated monomer. Suitable ethylenically unsaturated carboxylic acid monomers include acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid. Preferred ethylenically unsaturated carboxylic acid monomers are acrylic acid and methacrylic acid. The second ethylenically unsaturated monomer includes styrene, vinyltoluene, α-methyl styrene, vinyl naphthalene, vinyl acetate, acrylonitrile, (meth)acrylamide, mono- and di-substituted (meth)acrylamide, various (C$_1$–C$_{20}$)alkyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, lauryl (meth)acrylate, oleyl (meth)acrylate, palmityl (meth)acrylate, and stearyl (meth)acrylate; and other (meth)acrylates such as isobornyl (meth)acrylate, benzyl (meth)acrylate, phenyl (meth)acrylate, and 1-naphthyl (meth)acrylate; alkoxyalkyl (meth)acrylate such as ethoxyethyl (meth)acrylate. The acid macromonomers contain as polymerized units from 50 to 100 mole percent ethylenically unsaturated carboxylic acid monomer, preferably from 70 to 100 mole percent, and most preferably from 90 to 100 mole percent of these monomers.

Various conventional polymerization methods are suitable for preparing the acid macromonomers including anionic polymerization as disclosed in U.S. Pat. No. 4,158,736; radical polymerization with chain transfer agents such as cobalt complexes as described in U.S. Pat. No. 5,324,879; catalytic chain transfer polymerization with terminally unsaturated acid macromonomers used as chain transfer agents as described in U.S. Pat. No. 5,362,826; and high temperature radical polymerization as described in U.S. Pat. No. 5,710,227. Alternatively, the terminally unsaturated acid macromonomers of formula I are prepared by conventional radical polymerization using a hydroxy-functional chain transfer agent such as 2-mercaptoethanol or an amine-functional chain transfer agent followed by the reaction of the hydroxyl group or the amine group with an ethylenically unsaturated monomer having a complementary reactive group to attach the terminal unsaturation. Examples of ethylenically unsaturated monomers with a complementary reactive group include glycidyl (meth)acrylate, isocyanatoethyl (meth)acrylate, or (meth)acrylic acid. The ethylenically unsaturated monomers with a complementary reactive group are attached to the fragment of the hydroxy-functional or amine-functional chain transfer agent by various linkages including ether, urethane, amide, amine, urea, or ester linkages. Bulk, solution, and emulsion polymerization using batch, semicontinuous, or continuous processes are suitable for preparation of the acid macromonomers of formulas I, II, and III.

Another method to prepare the acid macromonomers is polymerization of esters of ethylenically unsaturated carboxylic acid monomers such as ethyl acrylate, butyl acrylate, or methyl methacrylate followed by the partial or complete hydrolysis of the ester groups to obtain the carboxylic acid functionalities.

The phosphorus acid groups are incorporated into the first polymer by polymerization of a phosphorus acid monomer. The phosphorus acid monomer contains at least one ethylenic unsaturation and a phosphorus acid group. The phosphorus acid monomer is alternatively in the acid form or as a salt of the phosphorus acid group. Examples of phosphorus acid monomers include:

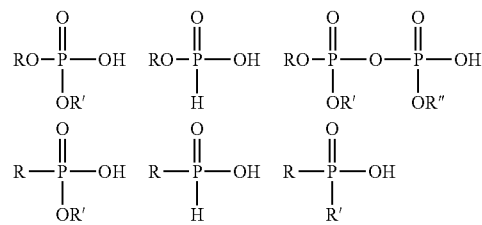

wherein R is an organic group containing an acryloxy, methacryloxy, or a vinyl group; and R' and R" are independently selected from H and a second organic group. The second organic group is alternatively saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for example phosphates of hydroxyalkyl(meth) acrylates including 2-hydroxyethyl (meth)acrylate, 3-hydroxypropyl (meth)acrylates, and the like. Other suitable phosphorus acid monomers are phosphonate functional monomers, such as are disclosed in WO 99/25780 A1, and include vinyl phosphonic acid, allyl phosphonic acid, 2-acrylamido-2-methylpropanephosphonic acid, $\alpha$-phosphonostyrene, 2-methylacrylamido-2-methylpropanephosphonic acid. Further suitable phosphorus acid monomers are 1,2-ethylenically unsaturated (hydroxy)phosphinylalkyl (meth)acrylate monomers, such as are disclosed in U.S. Pat. No. 4,733,005, and include (hydroxy)phosphinylmethyl methacrylate.

Preferred phosphorus acid monomers are dihydrogen phosphate monomers, which include 2-phosphoethyl (meth) acrylate, 2-phosphopropyl (meth)acrylate, 3-phosphopropyl (meth)acrylate, and 3-phospho-2-hydroxypropyl (meth) acrylate.

Alternatively, the multistage polymer particle having a select absorbing group contains a phosphorus acid full-ester group. The phosphorus acid full-ester group is incorporated into the first polymer by polymerization of the phosphorus acid full-ester monomer.

In the fourth aspect of the present invention, the multistage polymer particle contains at least one select functional group. The multistage polymer particle containing the select functional group is useful for preparing composite particles wherein the multistage polymer particles are attached to the surface of the inorganic particle through covalent bonds. Suitable select functional groups include acetoacetoxy groups, 1,3-dicarbonyl groups, aldehydes, acids, amines, epoxides, isocyanates, thioranes, isothiocyanates, alcohols, carbodiimides, aziridines, haloalkanes, and halophenyls. The select functional groups are incorporated into the first polymer by polymerization of a reaction mixture containing an ethylenically unsaturated monomer having a select functional group, at least one multiethylenically unsaturated monomer, and optionally, other second monomers. Examples of ethylenically unsaturated monomers having a select functional group are isocyanate monomers, such as isocyanato ethyl methacrylate, dimethyl meta-isopropenyl benzyl isocyanate; acetoacetoxy monomers, such as acetoacetoxy ethyl (meth)acrylate; aldehyde monomers, such as acrolein and methacrolein; amine monomers, such as t-butyl aminoethyl (meth)acrylate, dimethyl aminoethyl (meth)acrylate, aminobutyl (meth)acrylate, aminoethyl (meth)acrylate; aminopropyl (meth)acrylate; and oxazolidinoethyl (meth)acrylate; epoxy monomers, such as glycidyl (meth)acrylate; carboxylic acid monomers, such as (meth) acrylic acid, itaconic acid, fumaric acid, maleic acid, $\beta$-acryloxypropionic acid, ethacrylic acid, $\beta$-chloroacrylic acid, $\beta$-vinylacrylic acid, crotonic acid, $\alpha$-phenylacrylic acid, cinnamic acid, chlorocinnamic acid, and $\beta$-styrylacrylic acid; hydroxy containing monomers, such as hydroxyalkyl (meth)acrylates including 2-hydroxyethyl (meth)acrylate and 3-hydroxypropyl (meth)acrylate; halogenated monomers, such as bromopropyl (meth)acrylate; and halomethylstyrene.

The first polymer contains as polymerized units, from 0.5 to 30 weight % of the ethylenically unsaturated monomer having a select functional group or absorbing group, based on the weight of the first polymer. Preferably, the first polymer contains at least 1 weight %, and more preferably, at least 2 weight % of the ethylenically unsaturated monomer having a select functional group or absorbing group, based on the weight of the first polymer. Preferably, the first polymer contains 20 weight % or less, and more preferably, 12 weight % and less of the ethylenically unsaturated monomer having a select functional group or absorbing group, based on the weight of the first polymer.

The first polymer contains as polymer units, from 0.1 to 60 weight % of the multiethylenically unsaturated monomer, based on the weight of the first polymer. Preferably, the first polymer contains at least 0.2 weight %, and more preferably, at least 0.3 weight % of the multiethylenically unsaturated monomer, based on the weight of the first polymer. Preferably, the first polymer contains 40 weight % or less, and more preferably, 30 weight % and less of the multiethylenically unsaturated monomer, based on the weight of the first polymer. A suitable range for allyl methacrylate in the first polymer is from 0.1 to 10 weight %, bases on the weight of the first polymer. A suitable range for diacrylated and dimethacrylated monomers such as ethylene glycol dimethacrylate in the first polymer is from 0.5 to 60 weight %, based on the weight of the first polymer.

The first polymer also contains from 75 to 99.4 weight % of a second monomer. Preferably, the first polymer contains at least 80 weight %, and more preferably, at least 85 weight % of second monomer, based on the weight of the first polymer. Preferably, the first polymer contains 98.8 weight % or less, and more preferably, 97.7 weight % and less of second monomer, based on the weight of the first polymer. Preferred second monomers are butyl (meth)acrylate, methyl methacrylate, ethyl acrylate, 2-ethyl hexyl (meth) acrylate, (meth)acrylic acid, vinyl acetate, (meth)acrylonitrile, and styrene.

In one embodiment, the first polymer has one or more of the select absorbing groups and also contains one or more of the select functional groups provided that the functional groups do not materially impair the absorption of the multistage polymer particle to the surface of an inorganic particle.

In another embodiment, the first polymer has one or more select functional groups and also contains one or more of the select absorbing groups provided that the absorbing groups do not materially impair the reaction of the functional groups to form covalent bonds.

The second polymer contains second monomer as polymerized units and optionally, multiethylenically unsaturated monomer. In coating applications, a level of multiethylenically unsaturated monomer contained as polymerized units in the second polymer is chosen such that film formation is not materially impaired.

In one embodiment, the multistage polymer particle contains a first polymer having at least one absorbing group or at least one select functional group. In this embodiment, the second polymer is substantially free of absorbing groups. As used herein, "substantially free of absorbing groups" is defined as the weight % of the absorbing groups in the second polymer, based on the weight of the second polymer, of 10% or less, preferably 5% or less, and more preferably 2% or less, of the weight % of the absorbing groups in the first polymer, based on the weight of the first polymer. Preferred are second polymers prepared without absorbing groups. Further, the second polymer optionally contains functional groups, provided that these functional groups do not materially impair with the absorption of the multistage polymer particles to the surface of an inorganic particle.

In another embodiment, the multistage polymer particle contains a first polymer having at least one select functional group. In this embodiment, the second polymer is substantially free of the at least one select functional group. As used herein, "substantially free of the at least one select functional group" is defined as the weight % of the at least one functional group in the second polymer, based on the weight of the second polymer, of 10% or less, preferably 5% or less, and more preferably 2% or less, of the weight % of the at least one select functional group in the first polymer, based on the weight of the first polymer. Preferred are second polymers prepared without the at least one select functional group. Further, the second polymer optionally contains as at least one absorbing group, provided that this absorbing group does not materially impair with the reaction of the functional group to form a covalent bond.

A multistage emulsion polymerization process is employed to prepare the multistage polymer particles of this invention. In the multistage emulsion polymerization process, at least two polymerization stages or steps are conducted in sequential fashion, wherein at least one of the stages prepares a polymer composition that is compositionally different from the polymer compositions of the remaining stages. The first polymer is formed either before or after the polymerization of the second polymer, i.e., either the second polymer is formed in the presence of the first polymer or the first polymer is formed in the presence of the second polymer. A preferred process for forming the multistage polymer particles is polymerization of the first polymer prior to the polymerization of the second polymer. Multistage polymerization techniques include processes wherein the first stage polymerization and the subsequent second stage polymerization occur in the same reaction vessel; and processes wherein the first stage polymerization and the second stage polymerization are sequential steps in separate reaction vessels.

Preferably, the aqueous polymerization of the first polymer from a reaction mixture that contains acid macromonomer is conducted in an aqueous reaction medium having a pH below 5, more preferably at a pH below 4, and most preferably in a pH range of 2 to 4.

Preferably, the aqueous polymerization of the first polymer from a reaction mixture that contains phosphorus acid monomer is conducted in an aqueous reaction medium having a low pH. As used herein, a low pH is a pH of less than 2, preferably less than or equal to 1.7, and more preferably less than or equal to 1.5. Suitable pH ranges for the low pH polymerization of the phosphorus acid monomer include pH values in the range of from −1 to less than 2, preferably from −1 to less than 1.8, and more preferably from −1 to 1.5. In one embodiment, the phosphorus acid monomer is polymerized at a pH in the range of from 0 to less than 1.8, preferably in the range of from 0 to 1.7, and more preferably in the range of from 0 to 1.6. The pH of the aqueous reaction medium is adjusted to a low pH by the addition of strong acids, such as sulfuric acid; sulfurous acid; alkyl sulfonic acids, such as methyl sulfonic acid and alkyl ethylene oxide sulfonic acids; aryl sulfonic acids, such as benzosulfonic acid; dodecyl benzene sulfonic acid; and naphthalene sulfonic acid; sulfamic acid; hydrochloric acid; iodic acid; periodic acid; selenic acid; chromic acid; nitric acid; pyrophosphoric acid; trifluoroacetic acid; dichloroacetic acid; trichloroacetic acid; dihydroxymalic acid; maleic acid; dihydroxytartaric acid; oxalic acid; and trihydroxybenzoic acid. The strong acid is added to the aqueous reaction medium prior to the complete polymerization of the phosphorus acid monomer, including, for example, prior to the addition of the phosphorus acid monomer, during the addition of the phosphorus acid monomer, and both before and during the addition of the phosphorus acid monomer. Alternatively, the strong acid is added to the aqueous reaction medium after the addition of the phosphorus acid monomer, but prior to the polymerization of the phosphorus acid monomer. Base is optionally added to raise the pH of the aqueous reaction medium after the polymerization of the phosphorus acid monomer is complete.

The pH of the aqueous reaction medium is determined using a pH meter equipped with electrodes, such as silver chloride electrodes. The pH measurement is alternatively conducted on the aqueous reaction medium in the reaction vessel or is conducted on an aliquot of the aqueous reaction medium that has been removed from the reaction vessel. The pH measurement is made with the tested sample of the aqueous reaction medium at 20° C. The pH of the aqueous reaction medium is alternatively measured prior to, during, or after the polymerization of the phosphorus acid monomer. A pH measurement after the polymerization of the phosphorus acid monomer is made prior to the addition of substances that change the pH of the aqueous reaction medium.

Although not intending to be limited to a particular theory, the inventors believe that the aqueous polymerization of phosphorus acid monomer to prepare an aqueous dispersion containing polymer particles having phosphorus acid groups, such as the multistage polymer particle, also results in the formation of water soluble polymer having phosphorus acid groups. The water soluble polymer having phosphorus acid groups is an addition polymer containing at least two phosphorus acid groups that are alternatively independently located pendant to the backbone of the water soluble polymer and in a terminal position. Polymerization of the phosphorus acid monomer to form the water soluble polymer having phosphorus acid groups competes with the polymerization of phosphorus acid monomer to form the first polymer of the multistage polymer. This competition results in the reduction in the amount of the phosphorus acid monomer incorporated into the multistage polymer particle. Further, in certain applications, such as the formation of composite particles from titanium dioxide particles, the water soluble polymer having phosphorus acid groups is believed to have a deleterious effect, leading to flocculation of the titanium dioxide particles. Polymerization of the phosphorus acid monomer at low pH is believed to minimize formation of the water soluble polymer having phosphorus acid groups. Although not wishing to be limited to a particular theory, the inventors believe that in an aqueous reaction medium at low pH, the phosphorus acid monomer is protonated and is less water soluble than at higher pH. Polymerization of the protonated phosphorus acid monomer leads to increased incorporation of the phosphorus acid monomer into the growing polymer particles and a reduction in the formation of the water soluble polymer having phosphorus acid groups in the aqueous reaction medium.

As used herein, the phosphorus acid groups of the water soluble polymer having phosphorus acid groups are referred to as "second phosphorus acid groups". As used herein, the phosphorus acid groups of the multistage polymer particle are referred to as "first phosphorus acid groups". Contemplated are compositions in which the first phosphorus acid groups and the second phosphorus acid groups are the same, and compositions in which the first phosphorus acid groups and the second phosphorus acid groups are different. At a pH of 3 and above, the water soluble polymer having phosphorus acid groups is a component of the aqueous medium. The water soluble polymer having phosphorus acid groups is alternatively a homopolymer or a copolymer having a degree of polymerization of at least 2. Preferably, the aqueous medium is substantially free of water soluble polymer having phosphorus acid groups wherein the weight average molecular weight of the water soluble polymer having phosphorus acid groups is preferably at least 10,000, more preferably at least 25,000, and more preferably at least 40,000, as measured by aqueous gel permeation chromatography using a polyacrylic acid standard.

In one embodiment, the polymer composition is provided as an aqueous polymer dispersion containing the multistage polymer particles having a phosphorus acid group, wherein the multistage polymer particles are dispersed in an aqueous medium. In this embodiment, the aqueous medium is further characterized as being substantially free of water soluble polymer having second phosphorus acid groups. As used herein, the term "substantially free of water soluble polymer having second phosphorus acid groups" refers to levels of the water soluble polymer having second phosphorus acid groups in the aqueous medium defined by ratios of equivalents of second phosphorus acid groups to equivalents of first phosphorus acid groups in the range of less than or equal to 1.5, preferably less than or equal to 1, and more preferably, less than or equal to 0.75. A suitable lower limit for the level of water soluble polymer having second phosphorus acid groups in the aqueous medium is zero equivalents of second phosphorus acid groups. The aqueous composition of this embodiment, is formed by various methods including low pH polymerization of phosphorus acid monomer and processes that remove the water soluble polymer having second phosphorus acid groups, such as diafiltration and conventional separation techniques, which separate the multistage polymer particles from the aqueous medium and then redisperse the multistage polymer particles in a new aqueous medium substantially free of water soluble polymer having second phosphorus acid groups. The aqueous polymer dispersion of this embodiment is useful for preparing composite particles that provide dried coatings with increase levels of hiding.

Optionally, the phosphorus acid monomer is treated prior to polymerization to remove impurities such as saturated compounds containing phosphorus acid groups and salts thereof. Examples of saturated compounds containing phosphorus acid groups include inorganic phosphates, phosphoric acid, phosphorous acid, and 2-hydroxy ethyl ester of phosphoric acid, and their salts.

The second, fifth, and eighth aspects of the present invention are directed towards composite particles, each containing a single center inorganic particle surrounded by a plurality of polymer particles. The polymer particles are attached to the surface of each inorganic particle and minimize contact between adjacent inorganic particles. Suitable composite particles include inorganic particles having either complete or partial surface coverage of the inorganic particle by the polymer particles, provided that the polymer particles sufficiently encapsulate the inorganic particles to prevent contact between neighboring inorganic particles. In a dried coating, the inorganic particles are distributed within a continuous polymeric medium, referred to herein as the "polymer matrix".

Typically, the composite particle has an average of from 50 to 250 volume % multistage polymer particles based on the volume of the inorganic particle. Preferably, the composite particle contains from 75 to 225 volume % multistage polymer particles, and more preferably, from 100 to 200 volume % multistage polymer particles, based on the volume of the inorganic particle.

Suitable inorganic particles include pigment particles; and extender particles, also referred to in the art as filler particles. The pigment particles are commonly employed to provide light scattering sites within the polymer matrix, such as a dried coating, thus providing hiding or opacity to the dried coating. Extender particles are often employed to fill space within a polymer matrix or to modify the properties of a polymer matrix, such as increase tensile strength or improve the surface abrasion resistance.

The pigment particles are characterized as having an index of refraction that is significantly greater than the index of refraction of the polymer matrix. Suitable pigment particles have an index of refraction of at least 1.8, preferably at least 1.9, and more preferably at least 2.0. The indices of refraction for various materials are listed in *CRC Handbook of Chemistry and Physics,* $80^{th}$ *Edition,* D. R. Lide, editor, CRC Press, Boca Raton, Fla., 1999, pages 4–139 to 4–146.

The shape of the pigment particles is not important and can be of any shape provided that the pigment particles scatter photons having wavelengths in the spectral region of from 750 nm to 300 nm, preferably in the visible spectral region of from 700 nm to 380 nm. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes preferably have average diameters in the range of from 10 nm to 1 micron, preferably in the range of from 100 nm to 500 nm, and more preferably, in the range of from 200 nm to 300 nm. Pigment particles having nonspherical shapes preferably have average diameters, defined as their maximum dimension, of up to 1 micron, preferably up to 500 nm, and more preferably up to 300 nm. Information about the average diameters of pigment particles is typically provided by pigment particle suppliers.

The pigment particles alternatively have a uniform composition, or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, and zirconia. For example, certain embodiments of titanium dioxide particles suitable for use in coatings of the present invention have a coating of silica and a coating of alumina.

Suitable species of pigment particles include zinc oxide, antimony oxide, zirconium oxide, chromium oxide, iron oxide, lead oxide, zinc sulfide, lithopone, and forms of titanium dioxide such as anatase and rutile. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide. A composition containing two different forms of a material, such as rutile and anatase titanium dioxide, is considered to have two different pigments.

The extender particles have an index of refraction which is similar to the index of refraction of the polymer matrix, and do not significantly scatter visible light. Extender particles have an index of refraction of less than 1.8 and typically greater than or equal to 1.3. Extender particles are categorized as small extender particles, which have an average particle diameter of less than or equal to twice the average particle diameter of the pigment particles, and as large extender particles, which have an average particle diameter of greater than twice the average particle diameter of the pigment particles. Suitable extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc.

The pigment particles and the extender particles are defined herein according to their average particle diameters and indices of refraction as follows:

|  | Index of Refraction | Average Particle Diameter |
| --- | --- | --- |
| pigment particle | 1.8 or greater | 1 micron or smaller |
| small extender particle | 1.3 to less than 1.8 | twice the average diameter of pigment particle or smaller |
| large extender particle | 1.3 to less than 1.8 | greater than twice the average diameter of pigment particle |

The second and the eighth aspects of the present invention are directed towards a composite particle including a plurality of polymer particles having select pendant absorbing groups attached to the surface of an inorganic particle. This composite particle is prepared by first admixing a first aqueous medium containing a dispersion of inorganic particles, the aqueous composition containing the dispersed polymer particles having select pendant absorbing groups, and optionally dispersant. Next, the polymer particles having select pendant absorbing groups are allowed sufficient time to attach to the pigment particles to form the composite particles. The attachment of the polymer particles having the select pendant absorbing groups to the inorganic particles is believed to occur by absorption and is also believed to be spontaneous and will continue until the occurrence of one of the following: the polymer particles having select pendant absorbing groups are completely adsorbed to the surfaces of the inorganic particles; the surfaces of the inorganic particles are completely covered with polymer particles having select pendant absorbing groups; or an equilibrium is achieved between adsorbed polymer particles having select pendant absorbing groups and polymer particles having select pendant absorbing groups remaining dispersed in the aqueous medium. The time required for the completion of adsorption typically depends upon one or more of the following parameter: the pigment particle type, the surface treatment of the pigment particle, dispersant type and concentration, the concentrations of the inorganic particles and the polymer particles having select absorbing groups, and temperature. The time required for the complete adsorption of the polymer particles to the inorganic particles varies from instantaneously upon admixing of the first aqueous medium and the aqueous polymer dispersion to longer times, which are typically on the order of several hours in duration such as 6 to 12 hours, although still longer times of up to days or weeks may be required, depending on the above mentioned parameters. Where very long times are necessary for complete adsorption to occur, the composite particles so formed may be deemed not to be commercially viable. Pre-mixing the aqueous medium containing the inorganic particles and the polymer particles having select pendant absorbing groups typically reduces the time for the completion of adsorption. For composites prepared with titanium dioxide particles as the pigment particles, adsorption of the polymer particles having select absorbing groups typically requires about 1 to about 12 hours for complete adsorption. Other optional components are permissible in the aqueous medium during the formation of the composite particle, provided these components do not substantially inhibit or substantially interfere with the adsorption of the polymer particle having select absorbing groups to the inorganic particle. Examples of other components include co-solvents; wetting agents; defoamers; surfactants; biocides; other copolymers; and other pigments. Preferably the composite particle is formed in an aqueous medium in the absence of other co-polymers and other pigments. Optionally, the composite particle is prepared with levels of dispersant in the range of from 0 to 2 weight %, preferably from 0 to 1 weight %, and more preferably from 0 to 0.5 weight %, based on the weight of the pigment particle. Suitable dispersants include anionic polyelectrolyte dispersants such as co-polymerized maleic acid, co-polymers including co-polymerized acrylic acid, co-polymers including co-polymerized methacrylic acid, and the like; and carboxylic acids containing molecules such as tartaric acid, succinic acid, and citric acid.

Alternatively, the composite particles containing the polymer particles having select pendant absorbing groups is prepared by dispersing dry inorganic particles into the second aqueous medium containing the polymer particles having select pendant absorbing groups. Typically, high shear mixing is employed to disperse the inorganic particles.

In the preparation of composite particles containing the polymer particles having select pendant absorbing groups, the first aqueous medium containing the inorganic particles, the second aqueous medium containing the polymer particles having select pendant absorbing groups, and, optionally, the dispersant, are admixed by adding the first aqueous medium to the second aqueous medium, and alternatively, by adding the second aqueous medium to the first aqueous medium. The optional dispersant is added alternatively to the first aqueous medium, the second aqueous medium, and to the mixture of the first aqueous medium and the second aqueous medium. Mixing is typically provided to ensure that the inorganic particles and the polymer particles having select pendant absorbing groups are distributed uniformly in the combined aqueous medium. It is preferred that the first aqueous medium containing the inorganic particle dispersion or slurry is added to the second aqueous medium containing the polymer particles having select pendant absorbing groups, rather than vice versa, so that situations in which there is a temporary "excess" of inorganic particles relative to the polymer particles having select pendant absorbing groups, and the possibility of grit formation through bridging flocculation of the polymer particles having select pendant absorbing groups due to the excess of inorganic particles, are avoided.

In the eighth aspect of the present invention, the composite particle is formed from by admixing a first aqueous medium containing a dispersion of inorganic particles and an aqueous composition containing polymer particles dispersed in an second aqueous medium, wherein the polymer particles have pendant phosphorus acid full-ester groups. The resulting composite particle contains an inorganic particle having a surface and a plurality of polymer particles that have a pendant phosphorus acid full-ester group, attached to the surface of the inorganic particle.

In the second aspect of the present invention, the composite particle is formed by admixing a first aqueous medium containing a dispersion of inorganic particles and an aqueous composition containing the multistage polymer particles of the first aspect of this invention. These multistage polymer particles include the first polymer having select pendant absorbing groups are chosen from phosphorus acid groups, phosphorus acid full-ester groups, and polyacid sidechain groups. The resulting composite particle contains an inorganic particle having a surface and a plurality of polymer particles that have select pendant absorbing groups.

In one embodiment, the composite particle is formed from a plurality of multistage polymer particles, wherein each of the multistage polymer particles contain the same select pendant absorbing group. An example is a composite particle containing absorbed multistage polymer particles with phosphonic acid groups.

In another embodiment, the composite particle formed from a plurality of multistage polymer particles wherein the plurality of multistage polymer particles includes two or more different multistage polymer particles. The two different multistage polymer particles, referred to herein as the "first multistage polymer particle" and the "second multistage polymer particle" differ compositionally, physically, or both compositionally and physically from each other. One example is a composite particle formed from a plurality of multistage polymer particles, wherein the plurality includes at least one first multistage polymer particle having a phosphorus acid full-ester group and at least one second multistage polymer particle having a polyacid sidechain group. Another example is a composite particle formed from a plurality of multistage polymer particles, wherein the plurality includes at least one first multistage polymer particle having a second polymer with a glass transition temperature of $-20°$ C. and at least one second multistage polymer particle having a second polymer with a glass transition temperature of $25°$ C. A further example is a composite particle formed from a plurality of multistage polymer particles, wherein the plurality includes at least one first multistage polymer particle having an average particle diameter of 100 nm and at least one second multistage polymer particle having an average particle diameter of 180 nm. A still further example is a composite particle formed from a plurality of multistage polymer particles, wherein the plurality includes at least one first multistage polymer particle having an average weight ratio of the first polymer to the second polymer of 1:4, and at least one second multistage polymer particle having an average weight ratio of the first polymer to the second polymer of 1:12. The composite particle of this embodiment is prepared by admixing the first aqueous medium containing the inorganic particles, an aqueous medium containing the first multistage polymer particles, and an aqueous medium containing the second multistage polymer. The order of addition of the various components is not important, although processes that minimize the formation of grit are preferred.

In one embodiment, an aqueous composite particle composition is prepared from an aqueous polymer dispersion containing multistage polymer particles having phosphorus acid groups, also referred to as first phosphorus groups. The aqueous composite particle composition contains composite particles dispersed in an aqueous medium. The aqueous medium of this embodiment is characterized as being substantially free of water soluble polymer having second phosphorus acid groups, and having select molecular weights. In this aqueous composite particle composition, the composite particles are formed in an aqueous medium substantially free of water soluble polymer having second phosphorus acid groups, wherein the water soluble polymer has a weight average molecular weight of at least 40,000, preferably at least 50,000, and more preferably at least 70,000. Although not intending to be limited to a particular theory, the inventors believe that the water soluble polymer having phosphorus acid groups and having select molecular weights is believed to cause bridging flocculation of the inorganic particles. For compositions containing pigment particles as the inorganic particles, this flocculation can lead to a reduction in the hiding efficiency of the pigment particles in a dried coating. Reduction or elimination of the water soluble polymer having second phosphorus acid groups allows the preparation of coatings with improved hiding. Preferably, the composite particle of this embodiment contain multistage polymer particles that were prepared by a process including the low pH polymerization of phosphorus acid monomer.

The fifth aspect of the present invention is directed towards a covalent bonded composite particle including a pigment particle having a plurality of multistage polymer particles attached to the pigment particle by covalent bonds. The multistage polymer particles are indirectly attached to the pigment particle through a linkage that has a covalent bond with the surface of the pigment particle and a second covalent bond with the multistage polymer particle. The linkage is formed from a select coupling agent having a first functional group that reacts to form a first covalent bond with the surface of the pigment particle and a second functional group that reacts with the complementary functional group of the multistage polymer particle to form a second covalent bond.

The covalently bonded composite particle is prepared from a pigment particle having a surface containing a substance selected from metals, metal oxides, sulfides, salts, nonmetals, nonmetal sulfides, nonmetal oxides, and combinations thereof. The surface of the pigment particle is the native surface of the pigment particle. Alternatively, the surface of the pigment particle is a surface having a surface treatment thereon, which surface treatment provides a suitable surface for formation of covalent bonds. The covalent bond is formed with an atom on or at the surface of the pigment particle, including any optional coating or surface treatment. In the presence of water, the surface of the pigment particle typically has hydroxyl groups.

The covalently bonded composite particle has the multistage polymer particles indirectly attached to the surface of the pigment particle through linkages, which are reacted coupling agents, and are bonded to atoms on or at the surface of the pigment particle by bonds selected from: ether bonds, thiol ether bonds, and siloxane ether bonds. The atom on or at the surface of the pigment particle is selected from Ti, Al, Zr, Si, Zn, Cr, Sn, Fe, C, and Pb. The linkages are also bonded to the multistage polymer particles by at least one group selected from: esters, amides, ethers, urethanes, thiol ethers, amines, and ureidos.

The covalently bonded composite particle is formed by first admixing the pigment particle and a coupling agent. The coupling agent has a first functional group and a second functional group. The first functional group of the coupling agent reacts or is allowed to react with the pigment particle to form a modified pigment particle. The reacted first functional group of the coupling agent first forms a first covalent bond with the pigment particle, thereby forming a modified pigment particle. Next, the modified pigment particle is admixed with the multistage polymer particles having a complementary functional group, and the second functional group of the coupling agent, which is covalently bonded to the pigment particle, and the complementary functional groups of the polymer particle react or are allowed to react to form the covalently bonded composite particle. The reaction of the second functional group of the coupling agent and the complementary functional group of the multistage polymer particle similarly forms a second covalent bond. In this aspect of the invention, the multistage polymer particles are attached to the surface of the pigment particle by linkages, which are molecular chains forming first covalent bonds with the surface of the pigment particle and second covalent bonds with the multistage polymer particles. The linkages are formed by the reacted coupling agents.

The coupling agent typically has a molecular weight of less than 10,000, preferably less than 1,000, and most preferably less than 500. The reacted coupling agent has a reacted first functional group that forms a first covalent bond with the pigment particle and has a reacted second functional group that forms a second covalent bond with the first polymer component of the multistage polymer particle. Alternatively, the coupling agent contains more than one first functional group, provided that the coupling agent is bonded to only one pigment particle. Alternatively, the coupling agent also contains more than one second functional group. For example, a coupling agent such as 3-aminopropyltrimethoxysilane has three trimethoxysilane groups as the first functional groups. This coupling agent is capable of forming one, two, or three covalent bonds with the pigment particle. Similarly, the coupling agent alternatively contains more than one second functional group and is capable of alternatively forming more than one covalent bond with a single multistage polymer particle, or forming multiple individual covalent bonds with two or more multistage polymer particles. Suitable levels of coupling agent to form the composite particle include levels of from 0.1 to 50 equivalents of the second function group for each equivalent of complementary functional group.

Suitable first functional groups for attaching the coupling agent to the pigment particle include alkoxysilanes, acyloxysilanes, halosilanes, and silanols.

Second functional groups suitable for reaction with the complementary functional groups of the multistage polymer particle include, for example, isocyanates and isothiocyanates, which react with a complementary functional group selected from alcohols, amines, ureas, and anhydrides; aldehyde groups, which react with a complementary functional group selected from acetoacetoxy groups and amines; acetoacetoxy groups, which react with a complementary functional group selected from aldehydes and amines; epoxides, thioranes, and aziridines, which react with a complementary functional group selected from alcohols, carboxylic acids, anhydrides, amines, and mercaptans; carbodiimides, which react with a complementary functional group selected from carboxylic acids, alcohols, amines, and mercaptans; haloalkane and halomethylphenyl groups, which react with a complementary functional group selected from amines and carboxylic acids; amines and thiols, which react with a complementary functional group selected from epoxides, aziridines, thioranes, acetoacetoxy groups, isocyanates, isothiocyanates, and carbodiimides; and carboxylic acids, which react with a complementary functional group selected from epoxides, aziridines, thioranes, and carbodiimides.

Examples of suitable coupling agents include: aminosilanes, such as 4-aminobutylmethyldiethoxysilane, 3-aminopropyltrimethoxysilane, and N-(2-aminoethyl)-3-aminopropyldiethylisopropoxysilane; mercaptosilanes, such as (mercaptomethyl)dimethylethoxysilane, di-4-mercaptobutyldimethoxysilane, and 3-mercaptopropyltriisopropoxysilane; (meth)acrylosilanes, such as 3-methacryloxypropyldimethylethoxysilane and 3-acryloxypropyltrimethoxysilane; epoxysilanes, such as (3-glycidoxypropyl)methyldimethoxysilane and 2-(3,4-epoxycyclohexyl)ethyltrimethoxysilane; haloalkylsilanes, such as 3-chloropropyltrimethoxysilane, 4-bromobutylmethyldibutoxysilane, and 5-iodohexyldiethylmethoxysilane; iso(thio)cyanatosilanes, such as 3-isocyanatopropyltrimethoxysilane and 3-isothiocyanatopropylmethyldimethoxysilane; alcohol-functional silanes, such as 3-hydroxybutylisopropyldimethoxysilane, bis(2-hydroxyethyl)-3-aminopropyltriethoxysilane; (propyltrimethoxysilane) sulfide terminated poly(hydroxyethylacrylate); halophenylsilanes, such as bromophenyltrimethoxysilane and (2-(iodophenyl)ethyl)ethyldimethoxysilane; halomethylphenylsilanes, such as bis(chloromethylphenyl)dimethoxysilane and bromomethylphenyldimethylisopropoxysilane; carbodiimidesilanes, such as bis(propyltrimethoxysilane) carbodiimide and N-ethyl-N'-(propylethoxydimethoxysilane)-carbodiimide; aldehyde-functional silanes, such as 3-(trimethoxysilyl)propanal and (propyltrimethoxysilane) sulfide terminated methylmethacrylate-acrolein copolymer; and 1,3-diketone functional silanes, such as (3,5-hexandione)triethoxysilane, 3-(trimethoxysilyl)propyl acetoacetate, and (butyltriethoxysilane)sulfide terminated methylmethacrylate-butyl acrylate-acetoacetoxyethyl methacrylate copolymer.

Any one of the group of reactions including the reaction between a suitable complementary functional group and the pigment particle; the reaction between the first functional group and the pigment particle; and the reaction between the second functional group and a suitable complementary functional group, is optionally conducted in the presence of a catalyst. For example, tertiary amines and tin salts are suitable catalysts for the reaction between an isocyanate group as the second functional group and an alcohol as the complementary functional group. The extent of reaction of the first functional group, the second functional group, and the complementary functional group is determined using conventional analytical techniques such as infrared spectroscopy, nuclear magnetic resonance spectroscopy, and ultraviolet-visible spectroscopy.

One process to prepare the covalently bonded composite particle includes the steps of admixing the pigment particle and the coupling agent; forming the modified pigment particle by reacting or allowing to react the pigment particle and the first functional group of the coupling agent; admixing the modified pigment particle into an aqueous dispersion containing the multistage polymer particle having a complementary functional group; and forming the covalently bonded composite particle by reacting or allowing to react the second functional group of the reacted coupling agent, which is covalently bonded to the surface of the pigment particle, with the complementary functional group of the multistage polymer particle. The modified pigment particle is admixed and dispersed into the aqueous dispersion containing the multistage polymer particle having a complementary functional groups as a dry material. Alternatively, the modified pigment particle is provided as an aqueous dispersion and admixed with the aqueous dispersion containing the multistage polymer particle having a complementary functional group.

The select composite particles of the second, the fifth, and the eighth aspects of the present invention are useful in aqueous compositions, which are suitable for providing opaque dried coatings. These aqueous compositions contain the select composite particles, a binder, and an aqueous medium. The aqueous compositions are typically formed by first preparing the composite particles and then admixing the composite particles with binder. The binder is a polymer that is film forming at or below the application condition of the aqueous composition. The binder typically has glass transition temperatures in the range of from −60° C. to 80° C., preferably in the range of from −25° C. to 40° C., and more preferably, in the range of from −15° C. to 30° C., as calculated by the Fox equation. Polymers suitable as binders include homopolymers, a copolymers, an interpenetrating network polymers, and a blend of two or more polymers or copolymers. Examples of suitable binders include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and the like, and mixtures thereof. The aqueous composition contains the binder as dispersed polymer particles, solubilized polymers, or as partially solubilized polymer particles. Preferred are aqueous compositions containing the binder as polymer particles dispersed in the aqueous medium. Preferred are binder polymer particles having average diameter in the range of from 80 nm to 500 nm.

The aqueous medium of the aqueous composition containing composite particles and the binder optionally contains co-solvents including water miscible co-solvents such as methanol, ethanol, propanol, acetone ethylene glycol ethyl ethers, propylene glycol propyl ethers and diacetone alcohol; and water immiscible solvents such as propyl acetate, butyl acetate, methyl isoamyl ketone, amyl acetate, diisobutyl ketone, xylene, toluene, butanol, and mineral spirits.

A suitable range for the level of binder in the aqueous composition is from 10 to 90 volume %, based on the volume of the aqueous composition. A suitable range for the composite particles is from 10 to 75 volume %, based on the volume of the aqueous composition. A suitable range for the amount of extender included in the aqueous composition is from 0 to 70 volume %, based on the volume of the aqueous composition. Typically, the aqueous composition of this invention, when used to prepare opaque dried coatings, has a solids level in the range of from 20 to 50 volume %, based on the volume of the aqueous composition. The pH of the aqueous composition is typically in the range of from 3 to 11, and preferably, in the range of from 7 to 10. A suitable viscosity range for the aqueous composition is from 50 to 130 Kreb units (KU), preferably from 70 to 110 KU, and more preferably from 90 to 100 KU.

The aqueous composition optionally contains coalescents or plasticizers to provide the polymers with effective film formation temperatures at or below the application temperature. The level of optional coalescent is in the range of from 1 weight % to 40 weight %, based on the weight of the polymer solids.

A volatile organic compound ("VOC") is defined herein as a carbon containing compound that has a boiling point below 280° C. at atmospheric pressure. Compounds such as water and ammonia are excluded from the definition of VOC. The VOC level of a composition is the total amount of one or more volatile organic compounds contained in the composition.

Frequently a VOC is deliberately added to a paint or a coating composition to improve film formation of the resulting coating or to aid in the application properties of the composition employed to prepare the coating. Examples of VOCs are glycol ethers, organic esters, aromatic compounds, ethylene and propylene glycols, and aliphatic hydrocarbons. Additionally, method of paint or coating composition preparation may introduce adventitious VOCs from various ingredients such as the aqueous dispersion containing the polymer particles having pendant phosphorus acid full ester groups, the aqueous dispersion containing the multistage polymer particles, biocides, soaps, dispersants, and thickeners. These typically account for less than 20 g VOC per liter of the aqueous composition. Additional methods such as steam stripping and choice of low VOC containing additives like biocides, defoamers, soaps, dispersants, and thickeners can be used to further reduce the aqueous composition to less than 5 g VOC per liter of the aqueous composition.

Preferably, the aqueous composition of this invention has a VOC level of less than 150 grams per liter (g/liter)of the aqueous composition; more preferably the aqueous composition has a VOC level of less than 100 g/liter of the aqueous composition; and even more preferably the aqueous composition has a VOC level of less than 50 g/liter of the aqueous composition.

In addition, the aqueous composition optionally includes other components, including without limitation, other polymers, surfactants, other pigments, other extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, polymer particles having internal voids, and antioxidants.

The dried coating of this invention is typically prepared by applying the aqueous composition to a substrate by conventional methods such as, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the coating composition is typically in the range of from 1 micron to 250 microns. The aqueous composition is applied onto a substrate as a single coat or multiple coats. Preferably a single coat of the aqueous composition is applied. The coating is allowed to dry at ambient conditions, such as, for example, at from 0° C. to 35° C., and in the alternative, dried at elevated temperatures such as, for example, from 35° C. to 150° C.

The aqueous composition of this invention is suitable as a protective coating and in the alternative, as an aesthetic coating. Examples of suitable coatings include architectural coatings such as interior or exterior paint coatings, including masonry coatings; wood coatings and treatments; maintenance coatings such as metal coatings; paper coatings; leather coatings; polishes for leather; and traffic coatings such as those coatings used to provide markings on roads, pavements, and runways. Substrates suitable for the application of the aqueous composition include, for example, processed timber such as medium density fiber board; chip boards, and laminates; mineral substrates such as masonry, cement, fiber cement, cement asbestos, plaster, plaster board, glazed and unglazed ceramic; metal substrates such as galvanized iron, galvanized steel, cold rolled steel, Zincalum metal Zincalum II metal, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

The composite particles of the second, the fifth, and the eighth aspects of the present invention are useful for preparing dried coatings having a desired level of hiding, but with lower levels of pigment than conventional dried coatings prepared without these composite particles. These dried coatings formulated with lower levels of pigment have lower densities than conventional dried coatings, thus allowing the preparation of low weight dried coatings. Low weight dried coatings are important in applications such as coatings for transportation vehicles such as cars, buses, trucks, trains, and airplanes. Alternatively, these composite particles are useful for preparing dried coating having a desired level of pigment but providing a high level of hiding than conventional dried coatings prepared without these composite particles. The inventors have also discovered that aqueous compositions containing the composite particles having multistage polymer particles have tint strengths that are more reproducible than conventional aqueous compositions. Further, the aqueous compositions of the present invention typically can be formulated to a desired level of viscosity using lower levels of rheology modifiers or thickeners than aqueous compositions that do not contain the composite particles of this invention.

The following examples are presented to illustrate the composition and the process of the invention. These examples are intended to aid those skilled in the art in understanding the present invention. The present invention is, however, in no way limited thereby.

The following abbreviations are used in the examples:
surfactant-A surfactant having an average composition of lauryl-(ethylene oxide)$_4$ sodium sulfate; 30 weight % solids
BA butyl acrylate
MMA methyl methacrylate
PEM phosphoethyl methacrylate
ALMA allyl methacrylate
MAA glacial methacrylic acid
2-EHA 2-ethylhexyl acrylate
AN acrylonitrile
EA ethyl acrylate
ST styrene
BMA butyl methacrylate Preparation of Aqueous Dispersions Containing Multistage Polymer Particles Aqueous dispersions containing the multistage polymer particles were prepared in a 5-liter, four-necked round bottom flask equipped with a paddle stirrer, a thermometer, a nitrogen inlet, and a reflux condenser.

Unless noted otherwise, the PEM used in the preparation of the examples and comparative examples was unpurified and contained 52.2 weight % phosphoethyl methacrylate monomer, 33.2 weight % phosphodi(ethyl methacrylate), and 14.5 weight % phosphoric acid. The phosphodi(ethyl methacrylate) is a multiethylenically unsaturated monomer. The ammonium hydroxide was 28% active.

EXAMPLE 1.1

To the flask was added 1100 g deionized water and 4.5 g concentrated sulfuric acid. The contents of the flask was heated to 85° C. under a nitrogen atmosphere. The pH of the water in the flask was approximately 1. A monomer emulsion (ME-1), which was prepared by mixing 30 g deionized water, 6.0 g surfactant-A, 49.5 g BA, 30.7 g MMA, 0.90 g ALMA, 3.6 g MAA, and 5.3 g PEM, was added to the flask. Next, a solution containing 3.6 g sodium persulfate in 20 g deionized water was added. After maintaining the contents of the flask at 85° C. for 15 minutes, 7.0 g ammonium hydroxide was added to the flask to adjust the pH to a value in the range of 2 to 3. A second monomer emulsion (ME-2), which was prepared by mixing 200 g deionized water, 26 g surfactant-A, 352.4 g 2-EHA, 441.4 g MMA, and 16.2 g MAA, was added to the flask at a rate of 5 g/minute along with a separate cofeed of a solution of 1.0 g sodium persulfate in 90 g deionized water, while maintaining the contents of the flask at a temperature of 85° C. After 20 minutes, the feed rate of ME-2 was increased to 10 g/minute until the addition of ME-2 was complete. After the complete addition of ME-2 and the sodium persulfate solution, the contents of the flask was maintained at a temperature of 85° C. for 15 minutes and then cooled to room temperature. Next, 12 g ammonium hydroxide were added and the contents of the flask was filtered to remove any coagulum. The resulting dispersion, Example 1.1, had a solids content of 36.4 weight % and a pH of 8.5.

EXAMPLE 1.2

Example 1.2 was prepared according to the process for the preparation of the Example 1.1, except that ME-1 was prepared by mixing 30 g deionized water, 6.0 g surfactant-A, 49.5 g BA, 26.5 g MMA, 0.90 g ALMA, 3.6 g MAA, and 9.5 g PEM. The resulting dispersion, Example 1.2, had a solids content of 36.7 weight % and a pH of 8.3.

EXAMPLE 1.3

Example 1.3 was prepared according to the process for the preparation of the Example 1.1, except that ME-1 was prepared by mixing 30 g deionized water, 6.0 g surfactant-A, 49.5 g BA, 32.8 g MMA, 0.90 g ALMA, 3.6 g MAA, and 3.2 g PEM. The resulting dispersion, Example 1.3, had a solids content of 36.3 weight % and a pH of 8.8.

EXAMPLE 1.4

Example 1.4 was prepared according to the process for the preparation of the Example 1.1, except that ME-1 was prepared by mixing 30 g deionized water, 6.0 g surfactant-A, 49.5 g BA, 29.8 g MMA, 1.8 g ALMA, 3.6 g MAA, and 5.3 g PEM. The resulting dispersion, Example 1.4, had a solids content of 36.2 weight % and a pH of 8.5.

EXAMPLE 1.5

Example 1.5 was prepared according to the process for the preparation of the Example 1.1, except that ME-1 was prepared by mixing 30 g deionized water, 6.0 g surfactant-A, 49.5 g BA, 31.2 g MMA, 0.45 g ALMA, 3.6 g MAA, and 5.3 g PEM. The resulting dispersion, Example 1.5, had a solids content of 36.1 weight % and a pH of 8.4.

EXAMPLE 1.6

Example 1.6 was prepared according to the process for the preparation of the Example 1.1, except that ME-1 was prepared by mixing 30 g deionized water, 6.0 g surfactant-A, 49.5 g BA, 31.6 g MMA, 3.6 g MAA, and 5.3 g PEM. The resulting dispersion, Example 1.6, had a solids content of 36.0 weight % and a pH of 8.5.

EXAMPLE 1.7

Example 1.7 was prepared according to the process for the preparation of the Example 1.1, except that ME-1 was prepared by mixing 30 g deionized water, 6.0 g surfactant-A, 58.5 g BA, 21.7 g MMA, 0.90 g ALMA, 3.6 g MAA, and 5.3 g PEM. The resulting dispersion, Example 1.7, had a solids content of 36.5 weight % and a pH of 8.5.

EXAMPLE 1.8

Example 1.8 was prepared according to the process for the preparation of the Example 1.1, except that ME-1 was prepared by mixing 30 g deionized water, 3.0 g surfactant-A, 54.0 g BA, 18.0 g AN, 8.2 g MMA, 0.90 g ALMA, 3.6 g MAA, and 5.3 g PEM. The resulting dispersion, Example 1.8, had a solids content of 36.2 weight % and a pH of 8.2.

EXAMPLE 1.9

Example 1.9 was prepared according to the process for the preparation of the Example 1.1, except that ME-1 was prepared by mixing 30 g deionized water, 6.0 g surfactant-A, 63.0 g EA, 17.2 g MMA, 0.90 g ALMA, 3.6 g MAA, and 5.3 g PEM. The resulting dispersion, Example 1.9, had a solids content of 36.3 weight % and a pH of 8.3.

EXAMPLE 1.10

Example 1.10 was prepared according to the process for the preparation of the Example 1.1, except that ME-1 was prepared by mixing 30 g deionized water, 6.0 g surfactant-A, 17.1 g EA, 45.0 g BA, 18.1 g MMA, 0.90 g ALMA, 3.6 g MAA, and 5.3 g PEM. The resulting dispersion, Example 1.10, had a solids content of 36.5 weight % and a pH of 8.4.

EXAMPLE 1.11

Example 1.11 was prepared according to the process for the preparation of the Example 1.1, except that ME-2 was prepared by mixing 200 g deionized water, 26 g surfactant-A, 352.4 g 2-EHA, 324.0 g MMA, 117.5 g ST, and 16.2 g MAA; and after the contents of the flask was cooled to room temperature, the amount of ammonium hydroxide added was 18 g. The resulting dispersion, Example 1.11, had a solids content of 36.2 weight % and a pH of 8.5.

EXAMPLE 1.12

To the flask was added 800 g deionized water and 3.2 g concentrated sulfuric acid. The contents of the flask was heated to 85° C. under a nitrogen atmosphere. The pH of the water in the flask was approximately 1. A monomer emulsion (ME-1), which was prepared by mixing 30 g deionized water, 6.0 g surfactant-A, 49.5 g BA, 30.7 g MMA, 0.90 g ALMA, 3.6 g MAA, and 5.3 g PEM, was added to the flask. Next, a solution containing 2.6 g sodium persulfate in 20 g deionized water was added. After maintaining the contents of the flask at a temperature of 85° C. for 15 minutes, 5.0 g ammonium hydroxide was added to the flask to adjust the pH of a value in the range of 2 to 3. A second monomer emulsion (ME-2), which was prepared by mixing 200 g deionized water, 26 g surfactant-A, 437.4 g 2-EHA, 356.4 g MMA, and 16.2 g MAA, was added to the flask at a rate of 5 g/minute along with a separate cofeed of a solution 2.0 g sodium persulfate in 90 g deionized water, while maintaining the contents of the flask at a temperature of 85° C. After 20 minutes, the feed rate of ME-2 was increased to 10 g/minute until the addition of ME-2 was complete. After the complete addition of ME-2 feed and the sodium persulfate solution, the contents of the flask was maintained at a temperature of 85° C. for 15 minutes and then cooled to room temperature. Next, 12 g ammonium hydroxide were added and the contents of the flask was filtered to remove any coagulum. The resulting dispersion, Example 1.12, had a solids content of 40.8 weight % and a pH of 8.8.

EXAMPLE 1.13

To the flask was added 1100 g deionized water and 4.5 g concentrated sulfuric acid. The contents of the flask was heated to 85° C. under a nitrogen atmosphere. The pH of the water in the flask was approximately 1. A monomer emulsion (ME-1), which was prepared by mixing 30 g deionized water, 6.0 g surfactant-A, 49.5 g BA, 30.7 g MMA, 0.90 g ALMA, 3.6 g MAA, and 5.3 g PEM was added to the flask. Next, 10 g of a 0.1 weight % solution of ferric sulfate was added, and immediately followed by the addition of a mixture of 0.65 g t-butyl hydroperoxide (70% active) and 10 g deionized water. The next addition to the flask was a solution of 0.22 g isoascorbic acid in 10 g water over a period of 10 minutes. After maintaining the contents of the flask at a temperature of 85° C. for 5 minutes, 7.0 g ammonium hydroxide was added to adjust the pH to a value in the range of from 2 to 3. A second monomer emulsion (ME-2), which was prepared by mixing 200 g deionized water, 26 g surfactant-A, 352.4 g 2-EHA, 441.4 g MMA, and 16.2 g MAA was added to the flask at a rate of 5 g/minute along with a separate cofeed of a solution of 2.0 g sodium persulfate in 90 g deionized water, while maintaining the contents of the flask at a temperature of 85° C. After 20 minutes, the feed rate of ME-2 was increased to 10 g/minute until the addition of ME-2 was complete. After the complete addition of ME-2 and the sodium persulfate solution, the contents of the flask was maintained at a temperature of 85° C. for 15 minutes, and then cooled to room temperature. Next, 12 g ammonium hydroxide were added and the contents of the flask was filtered to remove any coagulum. The resulting dispersion, Example 1.13, had a solids content of 35.9 weight % and a pH of 8.5.

EXAMPLE 1.14

To the flask was added 1100 g deionized water. The contents of the flask was heated to 85° C. under a nitrogen atmosphere. The pH of the water in the flask was approximately 6.5. A monomer emulsion (ME-1), which was prepared by mixing 30 g deionized water, 6.0 g surfactant-A, 49.5 g BA, 30.7 g MMA, 0.90 g ALMA, 3.6 g MAA, and 5.3 g PEM, was added to the flask. Next, 10 g of a 0.1% solution of ferric sulfate was added, followed by the immediate addition of a mixture of 0.65 g t-butyl hydroperoxide (70% active) and 10 g deionized water. The next addition to the flask was a solution of 0.22 g isoascorbic acid in 10 g water over a period of 10 minutes. After maintaining the contents of the flask at a temperature of 85° C. for 5 minutes, 7.0 g ammonium hydroxide is added to the flask to adjust the pH to a value in the range of from 2 to 3. A second monomer emulsion (ME-2), which was prepared by mixing 200 g deionized water, 26 g surfactant-A, 352.4 g 2-EHA, 441.4 g MMA, and 16.2 g MAA, was added to the flask at a rate of 5 g/minute along with a separate cofeed of a solution of 2.0 g sodium persulfate in 90 g deionized water, while maintaining the contents of the flask at a temperature of 85° C. After 20 minutes, the feed rate of ME-2 was increased to 10 g/minute until the addition of ME-2 was complete. After the complete addition of ME-2 and the sodium persulfate solution, the contents of the flask was maintained at a temperature of 85° C. for 15 minutes and then cooled to room temperature. Next, 12 g ammonium hydroxide were added and the contents of the flask was filtered to remove any coagulum. The resulting dispersion, Example 1.14 had a solids content of 36.4 weight % and a pH of 8.9.

EXAMPLE 1.15

Example 1.15 was prepared according to the process for the preparation of the Example 1.1, except that ME-1 was prepared by mixing 30 g deionized water 6.0 g surfactant-A, 51.3 g 2-EHA, 28.9 g MMA, 0.90 g ALMA, 3.6 g MAA, and 5.3 g PEM; and ME-2 was prepared by mixing 200 g deionized water, 26 g surfactant-A, 405 g BA, 388.8 g MMA, and 16.2 g MAA. The resulting dispersion, Example 1.15, had a solids content of 36.2 weight % and a pH of 8.4.

EXAMPLE 1.16

To the flask was added 1200 g deionized water and 4.5 g concentrated sulfuric acid. The contents of the flask was heated to 85° C. under a nitrogen atmosphere. The pH of the water in the flask was approximately 1. A monomer emulsion (ME-1), which was prepared by mixing 26.5 g deionized water, 5.5 g surfactant-A, 45.0 g BA, 27.9 g MMA, 0.82 g ALMA, 3.27 g MAA, and 4.81 g PEM, was added to the flask. Next, a solution of 3.6 g sodium persulfate in 20 g deionized water was added. After maintaining the contents of the flask at a temperature of 85° C. for 15 minutes, a second monomer emulsion (ME-2), which was prepared by mixing 203.5 g deionized water, 26.6 g surfactant-A, 810.0 g BMA, and 8.2 g MAA, was added to the flask at a rate of 5 g/minute, while maintaining the contents of the flask at a temperature of 85° C. After 20 minutes, the feed rate of ME-2 was increased to 10 g/minute until the addition of ME-2 was complete. After the complete addition of ME-2, the contents of the flask was maintained at a temperature of 85° C. for 15 minutes and then cooled to room temperature. Next, 13 g ammonium hydroxide were added and the contents of the flask was filtered to remove any coagulum. The resulting dispersion, Example 1.16, had a solids content of 36.5 weight % and a pH of 8.5.

EXAMPLE 1.17

Example 1.17 was prepared according to the process for the preparation of the Example 1.16, except that ME-1 was prepared by mixing 23.0 g deionized water, 4.61 g surfactant-A, 38.1 g BA, 23.6 g MMA, 0.70 g ALMA, 2.8 g MAA, and 4.1 g PEM; and ME-2 was prepared by mixing 207 g deionized water, 27.4 g surfactant-A, 822.5 g BMA, and 8.3 g MAA. The resulting dispersion, Example 1.17, had a solids content of 36.3 weight % and a pH of 8.6.

EXAMPLE 1.18

Example 1.18 was prepared according to the process for the preparation of the Example 1.16, except that ME-1 was prepared by mixing 33.3 g deionized water, 6.67 g surfactant-A, 55.0 g BA, 34.1 g MMA, 1.0 g ALMA, 4.0 g MAA, and 5.9 g PEM; ME-2 was prepared by mixing 196.7 g deionized water, 25.3 g surfactant-A, 792 g BMA, and 8.0 g MAA; and after the contents of the flask was cooled to room temperature, the amount of ammonium hydroxide added was 14 g. The resulting dispersion, Example 1.18, had a solids content of 36.0 weight % and a pH of 8.7.

EXAMPLE 1.19

Example 1.18 was prepared according to the process for the preparation of the Example 1.16, except that ME-1 was prepared by mixing 42.9 g deionized water, 8.6 g surfactant-A, 70.7 g BA, 43.9 g MMA, 1.30 g ALMA, 5.1 g MAA, and 7.6 g PEM; ME-2 was prepared by mixing 187 g deionized water, 23.4 g surfactant-A, 763.7 g BMA, and 7.7 g MAA; and after the contents of the flask was cooled to room temperature, the amount of ammonium hydroxide added was 16 g. The resulting dispersion, Example 1.19, had a solids content of 36.2 weight % and a pH of 8.7.

EXAMPLE 1.20

Example 1.18 was prepared according to the process for the preparation of the Example 1.16, except that ME-1 was prepared by mixing 60.0 g deionized water, 8.6 g surfactant-A, 99.0 g BA, 61.4 g MMA, 1.80 g ALMA, 7.2 g MAA, and 10.6 g PEM; ME-2 was prepared by mixing 170.0 g deionized water, 23.4 g surfactant-A, 712.8 g BMA, and 7.2 g MAA; and after the contents of the flask was cooled to room temperature, the amount of ammonium hydroxide added was 17 g. The resulting dispersion, Example 1.20, had a solids content of 36.5 weight % and a pH of 8.4.

EXAMPLE 1.21

Example 1.21 was prepared according to the process for the preparation of the Example 1.16, except that ME-1 was prepared by mixing 20.0 g deionized water, 4.0 g surfactant-A, 33.0 g BA, 20.5 g MMA, 0.6 g ALMA, 2.4 g MAA, and 3.5 g PEM; and ME-2 was prepared by mixing 210.0 g deionized water, 28.0 g surfactant-A, 831.6 g BMA, and 8.4 g MAA. The resulting dispersion, Example 1.21, had a solids content of 36.5 weight % and a pH of 8.5.

EXAMPLE 1.22

Example 1.22 was prepared according to the process for the preparation of the Example 1.16, except that ME-1 was prepared by mixing 29.9 g deionized water, 6.1 g surfactant-A, 49.5 g BA, 30.7 g MMA, 0.9 g ALMA, 3.6 g MAA, and 5.3 g PEM; ME-2 was prepared by mixing 200.0 g deionized water, 25.9 g surfactant-A, 753.3 g BMA, 40.5 g BA, and 16.2 g MAA; and after the contents of the flask was cooled to room temperature, the amount of ammonium hydroxide added was 17 g. The resulting dispersion, Example 1.22, had a solids content of 36.4 weight % and a pH of 8.5.

EXAMPLE 1.23

To the flask was added 1200 g deionized water and 4.5 g concentrated sulfuric acid. The contents of the flask was heated to 85° C. under a nitrogen atmosphere. The pH of the water in the flask was approximately 1. A monomer emulsion (ME-1), which was prepared by mixing 25.2 g deionized water, 4.0 g surfactant-A, 45.0 g BA, 30.3 g MMA, 0.80 g ALMA, 3.3 g MAA, and 8.6 g of terminally unsaturated acrylic acid oligomer with an average MW of ~1200 (28.8% in water), was added to the flask. Next, a solution of 3.6 g sodium persulfate in 20 g deionized water was added. After maintaining the contents of the flask at a temperature of 85° C. for a period of 15 minutes, 7.0 g ammonium hydroxide was added to the flask to adjust the pH to a value in the range of 2 to 3. A second monomer emulsion (ME-2), which was prepared by mixing 205 g deionized water, 28.0 g surfactant-A, 801.8 g BMA, and 16.4 g MAA, was added to the flask at a rate of 5 g/minute along with a separate cofeed of a solution of 1.0 g sodium persulfate in 90 g deionized water, while maintaining the contents of the flask at a temperature of 85° C. After 20 minutes, the feed rate of ME-2 was increased to 10 g/minute until the addition of ME-2 was complete. After the complete addition of ME-2 and the sodium persulfate solution, the contents of the flask was maintained at a temperature of 85° C. for a period of 15 minutes and then cooled to room temperature. Next, 12 g ammonium hydroxide were added and the contents of the flask was filtered to remove any coagulum. The resulting dispersion, Example 1.23, had a solids content of 4.5 weight % and a pH of 8.5.

EXAMPLE 1.24

To the flask was added 1100 g deionized water and 4.2 g concentrated sulfuric acid. The contents of the flask was heated to 85° C. under a nitrogen atmosphere. The pH of the water in the flask was approximately 1. A monomer emulsion (ME-1), which was prepared by mixing 37.7 g deionized water, 5.5 g surfactant-A, 61.9 g BA, 38.4 g MMA, 1.1 g ALMA, 4.5 g MAA, and 6.6 g PEM, was added to the flask. Next, a solution containing 3.6 g sodium persulfate in 20 g deionized water was added. After maintaining the contents of the flask at a temperature of 85° C. for a period of 15 minute, 9.0 g ammonium hydroxide was added to adjust the pH to a value in the range of 2 to 3. A second monomer emulsion (ME-2), which was prepared by mixing 192.5 g deionized water, 26.5 g surfactant-A, 360.0 g BA, 345.5 g ST, and 14.4 g MAA was added to the kettle at a rate of 4 g/minute along with a separate cofeed of a solution of 1.0 g sodium persulfate in 90 g deionized water, while maintaining the contents of the flask at a temperature of 85° C. After the complete addition of ME-2 and the sodium persulfate solution, the contents of the flask was maintained at a temperature of 85° C. for a period of 15 minutes and then cooled to room temperature. Next, 12 g ammonium hydroxide were added and the contents of the flask was filtered to remove any coagulum. The resulting dispersion, Example 1.24, had a solids content of 35.0 weight % and a pH of 8.5.

EXAMPLE 1.25

Example 1.25 was prepared according to the process for the preparation of the Example 1.14, except that ME-1 was prepared by mixing 30 g deionized water, 6.0 g surfactant-A, 49.5 g BA, 30.7 g MMA, 0.90 g ALMA, 3.6 g MAA, and 5.3 g PEM; and ME-2 was prepared by mixing 200 g deionized water, 26 g surfactant-A, 352.4 g 2-EHA, 441.4 g MMA, and 16.2 g MAA. The resulting dispersion, Example 1.25, had a solids content of 36.5 weight % and a pH of 8.4.

EXAMPLE 1.26

To the flask was added 800 g deionized water and 3.2 g concentrated sulfuric acid. The contents of the flask was heated to 85° C. under a nitrogen atmosphere. The pH of the water in the flask was approximately 1. A monomer emulsion (ME-1), which was prepared by mixing 30 g deionized water, 6.0 g surfactant-A, 49.5 g BA, 30.7 g MMA, 0.90 g ALMA, 3.6 g MAA, and 5.3 g PEM, was added to the flask. Next, a solution containing 2.25 g sodium persulfate in 20 g deionized water was added to the flask. After maintaining the contents of the flask at a temperature of 85° C. for a period of 15 minutes, 7.0 g ammonium hydroxide was added to the flask to adjust the pH to a value of 5.5. The contents of the flask was then cooled to 72° C. Next, 10 g of a 0.1 weight % aqueous solution of ferric sulfate was added to the flask. A second monomer emulsion (ME-2), which was prepared by mixing 160 g deionized water, 54.2 g surfactant-A, 94.5 g BA, 535.5 g vinyl acetate, and 12.6 g sodium vinyl sulfonate (25% solution), was added to the flask at a rate of 5 g/minute along with separate cofeeds of a first solution containing 1.50 g sodium persulfate in 60 g deionized water and a second solution containing 0.36 g isoascorbic acid in 60 g deionized water, while maintaining the contents of the flask at a temperature of 72° C. After 20 minutes, the feed rate of ME-2 was increased to 10 g/minute until the addition of ME-2 was complete. After the complete addition of ME-2, the sodium persulfate solution, and the isoascorbic acid solution, the contents of the flask was maintained at a temperature of 72° C. for a period of 15 minutes and then cooled to room temperature. Next, 2 g ammonium hydroxide were added and the contents of the flask was filtered to remove any coagulum. The resulting dispersion, Example 1.26, had a solids content of 36.0 weight % and a pH of 5.7.

EXAMPLE 1.27

To the flask was added 800 g deionized water and 3.2 g concentrated sulfuric acid. The contents of the flask was heated to 85° C. under a nitrogen atmosphere. The pH of the water in the flask was approximately 1. A monomer emulsion (ME-1), which was prepared by mixing 30 g deionized water, 6.0 g surfactant-A, 49.5 g BA, 30.7 g MMA, 0.90 g ALMA, 3.6 g MAA, and 5.3 g PEM, was added to the flask. Next, a solution containing 2.25 g sodium persulfate in 20 g deionized water was added to the flask. After maintaining the contents of the flask at a temperature of 85° C. for a period of 15 minutes, 7.0 g ammonium hydroxide was added to the flask to adjust the pH to a value of 5.5. The contents of the flask was then cooled to 72° C. Next, 10 g of a 0.1 weight % aqueous solution of ferric sulfate was added to the flask. A second monomer emulsion (ME-2), which was prepared by mixing 200 g deionized water, 67.5 g surfactant-A, 121.5 g BA, 688.5 g vinyl acetate, and 32.4 g sodium vinyl sulfonate (25% solution), was added to the flask at a rate of 5 g/minute along with separate cofeeds of a first solution containing 2.20 g sodium persulfate in 60 g deionized water and a second solution containing 0.45 g isoascorbic acid in 60 g deionized water, while maintaining the contents of the flask at a temperature of 72° C. After 20 minutes, the feed rate of ME-2 was increased to 10 g/minute until the addition of ME-2 was complete. After the complete addition of ME-2, the sodium persulfate solution, and the isoascorbic acid solution, the contents of the flask was maintained at a temperature of 72° C. for a period of 15 minutes and then cooled to room temperature. Next, 2 g ammonium hydroxide were added and the contents of the flask was filtered to remove any coagulum. The resulting dispersion, Example 1.27, had a solids content of 39.0 weight % and a pH of 6.3

EXAMPLE 1.28

To the flask was added 800 g deionized water and 3.0 g concentrated sulfuric acid. The contents of the flask was heated to 85° C. under a nitrogen atmosphere. The pH of the water in the flask was approximately 1. A monomer emulsion (ME-1), which had been prepared earlier by mixing 12 g deionized water, 4.0 g surfactant-A, 8.0 g BA, and 28.0 g MMA was added to the flask. Next, a solution containing 2.4 g sodium persulfate in 20 g deionized water was added. The contents of the flask was maintained at a temperature of 85° C. for a period of 10 minutes. A second monomer emulsion (ME-2), which was prepared by mixing 45 g deionized water, 6.0 g surfactant-A, 86.4 g BA, 83.6 g MMA, 1.80 g ALMA, 1.8 g MAA, and 6.4 g PEM, was added to the flask at a rate of 5 g/minute. After the complete addition of ME-2, the contents of the flask was maintained at a temperature of 85° C. for a period of 10 minutes. Next, the pH of the kettle was adjusted to a value in the range of 2–3 with the addition of 7.0 g ammonium hydroxide. A third monomer emulsion (ME-3), which was prepared by mixing 140 g deionized water, 18.0 g surfactant-A, 270 g BA, 261.9 g MMA, and 8.1 g MAA, was then added to the flask at a rate of 10 g/minute along with a separate cofeed of a solution containing 1.0 g sodium persulfate in 40 g deionized water, while maintaining the contents of the flask at a temperature of 85° C. After the complete addition of ME-3 and the sodium persulfate solution, the contents of the flask was maintained at a temperature of 85° C. for a period of 15 minutes, and then cooled to room temperature. Next, 10 g ammonium hydroxide were added and the contents of the flask was filtered to remove any coagulum. The resulting dispersion, Example 1.28, had a solids content of 38.5 weight % and a pH of 8.5.

EXAMPLE 1.29

To the flask was added 1100 g deionized water and 4.5 g of concentrated sulfuric acid. The contents of the flask was heated to 85° C. under a nitrogen atmosphere. The pH of the water in the flask was approximately 1. A monomer emulsion (ME-1), which was prepared by mixing 30 g deionized water, 6.0 g surfactant-A, 49.5 g BA, 30.7 g MMA, 0.90 g ALMA, 3.6 g MAA, and 5.3 g PEM, was added to the flask. Next, a solution containing 3.6 g sodium persulfate in 20 g deionized water was added. After maintaining the contents of the flask at a temperature of 85° C. for a period of 10 minutes, 7.0 g ammonium hydroxide was added to adjust the pH to a value in the range of 2 to 3. Next, a second monomer emulsion (ME-2), which was prepared by mixing 200 g deionized water, 26 g surfactant-A, 352.4 g 2-EHA, 441.4 g MMA, and 16.2 g MAA, was added to the flask at a rate of 5 grams /minute along with a separate cofeed of a solution of 1.0 g sodium persulfate in 90 g deionized water, while maintaining the contents of the flask at a temperature of 85° C. After 20 minutes, the feed rate of ME-2 was increased to 10 g/minute until the addition of ME-2 was complete. After the complete addition of ME-2 and the sodium persulfate solution, the contents of the flask was maintained at a temperature of 85° C. for a period of 15 minutes at 85° C. and then cooled to room temperature. Next, 12 g ammonium hydroxide was added and the contents of the flask was filtered to remove any coagulum. The resulting dispersion, Example 1.29, had a solids content of 36.2 weight % and a pH of 8.5.

EXAMPLE 1.30

Example 1.30 was prepared according to the process for the preparation of Example 1.1, except that 4.5 g of nitric acid replaced the sulfuric acid. The resulting dispersion, Example 1.30, had a solids content of 36.1 weight % and a pH of 8.9.

Comparative A

To the flask was added 1600 g deionized water and 6.0 g of concentrated sulfuric acid. The contents of the flask was heated to 85° C. under a nitrogen atmosphere. The pH of the water in the flask was approximately 1. A monomer emulsion (ME-1), which was prepared by mixing 24 g deionized water, 8.0 g surfactant-A, 16.0 g BA, and 56.0 g MMA, was added to the flask. Next, a solution containing 4.8 g sodium persulfate in 40 g deionized water was added. The contents of the flask was maintained at a temperature of 85° C. for a period of 10 minutes. Next, a second monomer emulsion (ME-2), which was prepared by mixing 320 g deionized water, 32.0 g surfactant-A, 248.0 g BA, 825.6 g MMA, 12.0 g acrylic acid, and 42.4 g PEM, was added to the flask at a rate of 15 g/minute while maintaining the contents of the flask at a temperature of 85° C. After the complete addition of ME-2, the contents of the flask was maintained at a temperature of 85° C. for a period of 15 minutes and then cooled to room temperature. Next, 35 g ammonium hydroxide was added and the contents of the flask was filtered to remove any coagulum. The resulting comparative dispersion had a solids content of 35.7 weight % and a pH of 8.5.

Comparative B

To the flask was added 800 g deionized water and 3.0 g of concentrated sulfuric acid. The contents of the flask was heated to 85° C. under a nitrogen atmosphere. The pH of the water in the flask was approximately 1. A monomer emulsion (ME-1), which was prepared by mixing 12 g deionized water, 4.0 g surfactant-A, 7.9 g BA, 27.7 g MMA, and 0.40 g MAA, was added to the flask. Next, a solution containing 2.4 g sodium persulfate in 20 g deionized water was added. The contents of the flask was maintained at a temperature of 85° C. for a period of 10 minutes. Next, a second monomer emulsion (ME-2), which was prepared by mixing 170 g deionized water, 16.0 g surfactant-A, 280.1 g BA, 260.3 g MMA, 5.6 g acrylic acid, and 18.0 g purified PEM, was added to the kettle at a rate of 15 g/minute while maintaining the contents of the flask at a temperature of 85° C. After the complete addition of ME-2 feed, the contents of the flask was maintained at 85° C. for a period of 15 minutes, and then cooled to room temperature. Next, 16 g ammonium hydroxide was added and the contents of the flask was filtered to remove any coagulum. The resulting dispersion, Comparative B, had a solids content of 34.7 weight % and a pH of 8.6.

TABLE 1.1

Properties of Multistage Polymer Particles and Comparative Polymer Particles

| Sample | Particle Diameter (nm) | $1^{st}$ Polymer Tg (° C.) | $2^{nd}$ Polymer Tg (° C.) | Weight ratio of $1^{st}$ Polymer to $2^{nd}$ Polymer |
|---|---|---|---|---|
| Example 1.1 | 129 | −3 | −9.8 | 1:9 |
| Example 1.2 | 139 | −4.2 | −9.8 | 1:9 |
| Example 1.3 | 123 | −2.4 | −9.8 | 1:9 |
| Example 1.4 | 142 | −3 | −9.8 | 1:9 |
| Example 1.5 | 140 | −3 | −9.8 | 1:9 |

TABLE 1.1-continued

Properties of Multistage Polymer Particles and Comparative Polymer Particles

| Sample | Particle Diameter (nm) | 1st Polymer Tg (° C.) | 2nd Polymer Tg (° C.) | Weight ratio of 1st Polymer to 2nd Polymer |
|---|---|---|---|---|
| Example 1.6 | 131 | −3 | −9.8 | 1:9 |
| Example 1.7 | 130 | −16.3 | −9.8 | 1:9 |
| Example 1.8 | 170 | −10.7 | −9.8 | 1:9 |
| Example 1.9 | 148 | 6 | −9.8 | 1:9 |
| Example 1.10 | 134 | −14 | −9.8 | 1:9 |
| Example 1.11 | 128 | −3 | −9.8 | 1:9 |
| Example 1.12 | 138 | −3 | −27.9 | 1:9 |
| Example 1.13 | 114 | −3 | −9.8 | 1:9 |
| Example 1.14 | 118 | −3 | −9.8 | 1:9 |
| Example 1.15 | 120 | −33.2 | 5 | 1:9 |
| Example 1.16 | 136 | −3 | 21 | 1:10 |
| Example 1.17 | 139 | −3 | 21 | 1:12 |
| Example 1.18 | 136 | −3 | 21 | 1:8 |
| Example 1.19 | 130 | −3 | 21 | 1:6 |
| Example 1.20 | 143 | −3 | 21 | 1:4 |
| Example 1.21 | 145 | −3 | 21 | 1:14 |
| Example 1.22 | 134 | −3 | 17.2 | 1:9 |
| Example 1.23 | 140 | −1 | 17.2 | 1:10 |
| Example 1.24 | 140 | −3 | 3.7 | 1:7 |
| Example 1.25 | 127 | −3 | −9.8 | 1:9 |
| Example 1.26 | 155 | −3 | 12.8 | 1:7 |
| Example 1.27 | 170 | −3 | 12.8 | 1:9 |
| Example 1.28 | 122 | 6.9 | 4.9 | 1:3 |
| Example 1.29 | 133 | −3 | −9.8 | 1:9 |
| Example 1.30 | 130 | −3 | −9.8 | 1:9 |
| Comparative A | 113 | 51.6 | — | — |
| Comparative B | 120 | 6.4 | — | — |

EXAMPLE 2

Preparation of Composite Particles Containing Absorbed Multistage Polymer Particles Composite particles were prepared by dispersing titanium dioxide particles into an aqueous mixture containing the multistage polymer particles having first polymer with select absorbing groups.

An aqueous composite particle dispersion was prepared by combining the dispersion containing the multistage polymer particles with sufficient water to dilute the solids level of the polymer particles to 33.0 weight %. Next, 40.73 g TiPure™ R-746 titanium dioxide slurry (TiPure is a trademark of E. I. DuPont de Nemours and Company), supplied at 76.5 weight % solids, was added to 56.65 g of the mixture with stirring. The amount of polymer particles used was the amount required for the composite particles to have 60 weight % polymer particles based on the weight of the titanium dioxide particles. The resulting aqueous composite particle dispersion contained composite particles dispersed in an aqueous medium.

Preparation of Aqueous Compositions Containing Composite Particles and Binder

The aqueous compositions were prepared by first preparing master paints containing all the ingredients of the aqueous compositions, except for the titanium dioxide and the multistage polymer particles. The following master paints were prepared containing the listed ingredients in Tables 2.1 to 2.3

TABLE 2.1

Master Paint #1 (MP1)

| Ingredient | weight (g) |
|---|---|
| Rhoplex™ AC-261 binder (Rohm and Haas Company) | 1262.04 |
| water | 185.88 |
| Texanol™ coalescent (Eastman Chemical Corp) | 106.26 |
| Natrosol™ 250 HR thickener (2.5% in water) (Hercules Corp) | 166.32 |
| Colortrend™ 8807 black pigment (Huls America Inc.) | 41.96 |

TABLE 2.2

Master Paint #2 (MP2)

| Ingredients | Weight (g) |
|---|---|
| Rhoplex™ AC-261 binder | 1319.16 |
| water | 197.36 |
| Texanol™ coalescent | 110.63 |
| Natrosol™ 250 HR thickener (2.5% in water) | 170.76 |
| Supronil™ HK black dye (Clariant AG Corp) | 6.84 |

Master Paint #3 (MP3) was prepared by first combining the materials in Table 2.3a and mixing with a Premier Corporation Model 50 stirrer to make a grind containing clay particles. Next the grind was combined with the materials in Table 2.3b to prepare Master Paint #3.

TABLE 2.3a

Grind for Master Paint #3

| Ingredients | Weight (g) |
|---|---|
| water | 146.33 |
| Tamol™ 1254 dispersant (Rohm and Haas Company) | 10.45 |
| Colloid™ 643 dispersant (Allied Colloids Limited Co.) | 3.09 |
| 2-amino-2-methyl propanol (95% active) | 3.09 |
| Triton™ CF-10 surfactant (Dow Chemical Co.) | 0.46 |
| Omyacarb™ calcium carbonate (Omya Corp.) | 162.39 |
| ASP™-400 clay (Engelhard Corp.) | 155.06 |

TABLE 2.3b

Master Paint #3 (MP3)

| Ingredients | Weight (g) |
|---|---|
| grind | 409.22 |
| Rovace™ 661 binder (Rohm and Haas Company) | 107.35 |
| water | 12.84 |
| Texanol™ coalescent | 13.09 |
| 28% ammonia | 1.00 |
| Natrosol™ 250 HR thickener (2.5% in water) | 60.00 |
| Colortrend™ 8807 lampblack pigment | 10.70 |

The aqueous compositions were prepared by combining 50.23 g of the aqueous dispersions containing the composite particles with 39.09 g of either the Master Paint #1 or #2, or with 56.48 g of the Master Paint #3. The final aqueous composition were placed on a roller and allowed to mix overnight prior to testing.

Comparative aqueous compositions were prepared without the latex absorbing polymer particles. These comparative aqueous compositions contained the titanium dioxide particles at the same PVC as the aqueous compositions of this invention, which contained the titanium dioxide as composite particles.

Dried coated samples were prepared by applying a 76 micron (3 mil) thick wet film of the aqueous compositions onto Opacity Charts (The Leneta Company, Form 3B) with a Bird blade (MED Industries) and allowing the wet film to dry at 20° C. and 20% relative humidity for 4 to 6 hours.

The opacity or hiding of the dried film was characterized by the light scattering efficiency of the dried film, which was determined by measuring the Y-reflectance value for the dried coating sample. The Y-reflectance value is a measure of light scattering within the coating, in particular, light scattering by the titanium dioxide particles in the coating. The Y-reflectances of the dried coated samples were measured using a 45°/0° reflection setting with a Pacific Scientific Colorguard (Pacific Scientific). The delta Y-reflectance value was calculated by:

delta Y-reflectance value=$Y_1-Y_0$ where $Y_1$ is the Y reflectance for the coated sample including composite particles and $Y_0$ is the Y reflectance for the comparative coated sample which did not include composite particles. A delta Y-reflectance value greater than zero indicates improved light scattering compared to the comparative coating which did not contain composite particles. A difference of 0.1 unit or greater was regarded as significant.

The film properties of the dried coated samples were characterized by measuring the ability of the dried coated sample to withstand abrasive rubbing using the scrub resistance test. In the test, coated scrub test panels were prepared by applying films of the aqueous composition with a 0.18 mm (7 mil) gap drawdown bar on scrub test panels (#P121-10N from The Leneta Company). Comparative coated scrub test panels were also prepared using a comparative aqueous composition which did not contain composite particles. The coated scrub test panels were dried at 21° C. and 50% relative humidity for 7 days. The scrub resistance test was performed using an Abrasion Tester from Gardner Laboratory, according to the following procedure: The coated scrub test panel was placed on a scrub plate with two 1.3 cm wide brass shims placed 11.4 cm from each other. On a scrub brush was placed 10 ml of Standardized Scrub Medium (The Leneta Company, item # SC-2). The scrub bush was then placed on the coated scrub test panel and 5 ml of water was placed on the coating along the line that the scrub brush will travel during the scrub resistance test. The scrub resistance was evaluated by measuring the number of scrubs required to break through the coating (FB) at each side of the shim. Two coated scrub test panels were tested for each coating formulation. The scrub ratio (SR) was calculated by:

$$SR = 0.25[(FB_{1RR} + FB_{2RR})/(FB^0_{1RR} + FB^0_{2RR}) + (FB_{1LR} + FB_{2LR})/(FB^0_{1LR} + FB^0_{2LR}) + (FB_{1RL} + FB_{2RL})/(FB^0_{1RL} + FB^0_{2RL}) + (FB_{1LL} + FB_{2LL})/(FB^0_{1LL} + FB^0_{2LL})]$$

wherein $FB_{1LL}$ is the number of scrubs to break through the coating at the left edge of the left shim; $FB_{1RR}$ is the number of scrubs to break through the coating at the right edge of the right shim; $FB_{1LR}$ is the number of scrubs to break through the coating at the right edge of the left shim; and $FB_{1RL}$ is the number of scrubs to break through the coating at the left edge of the right shim. The FB variables with the zero subscript represent the number of scrubs at the various locations for the comparative dried coating. A scrub ratio greater than 0.5 indicated that the dried coating had an acceptable level of scrub resistance.

The gloss values for the dried coatings were determined using a Micro-Tri-Gloss meter (BYK-Gardner Co.).

The Y-reflectance value, optionally the gloss value, and optionally the scrub resistance were measured for each sample. Delta Y-reflectance values are calculated for the dried coatings prepared from the aqueous compositions.

TABLE 2.3

Master Paint #1

| Aqueous Composition | Multistage Polymer Particle | Y-reflectance | Delta Y | 20° gloss |
|---|---|---|---|---|
| Example 2.1 | Example 1.1 | 52.55 | 4.95 | 40.7 |
| Example 2.2 | Example 1.14 | 52.4 | 4.8 | 37.7 |
| Example 2.3 | Example 1.13 | 52.55 | 4.95 | 44.3 |
| Comparative C1 | — | 47.6 | — | 32.9 |

TABLE 2.4

Master Paint #1

| Aqueous Composition | Multistage Polymer Particle | Y-reflectance | Delta Y | 20° gloss |
|---|---|---|---|---|
| Example 2.4 | Example 1.25 | 52.45 | 3.7 | 35.9 |
| Comparative C2 | — | 48.75 | — | 27.5 |

TABLE 2.5

Master Paint #1

| Aqueous Composition | Multistage Polymer Particle | Y-reflectance | Delta Y | 20° gloss |
|---|---|---|---|---|
| Example 2.5 | Example 1.12 | 53.05 | 4.1 | 43.3 |
| Comparative C3 | — | 48.95 | — | 25 |

TABLE 2.6

Master Paint #1

| Aqueous Composition | Multistage Polymer Particle | Y-reflectance | Delta Y | 20° gloss |
|---|---|---|---|---|
| Example 2.6 | Example 1.26 | 52.75 | 3.45 | 27.6 |
| Example 2.7 | Example 1.27 | 52.6 | 3.3 | 30.3 |
| Comparative C4 | — | 49.3 | — | 30.5 |

TABLE 2.7

Master Paint #1

| Aqueous Composition | Multistage Polymer Particle | Y-reflectance | Delta Y | 20° gloss |
|---|---|---|---|---|
| Example 2.8 | Example 1.1 | 52.75 | 4.95 | 35.5 |
| Example 2.9 | Example 1.2 | 52.5 | 4.7 | 45.4 |
| Example 2.10 | Example 1.3 | 52.6 | 4.8 | 32 |
| Comparative C5 | — | 47.8 | — | 24.9 |

TABLE 2.8

Master Paint #1

| Aqueous Composition | Multistage Polymer Particle | Y-reflectance | Delta Y |
|---|---|---|---|
| Example 2.11 | Example 1.4 | 53.3 | 3.4 |
| Example 2.12 | Example 1.5 | 53.1 | 3.2 |
| Example 2.13 | Example 1.6 | 52.9 | 3 |
| Example 2.14 | Example 1.7 | 53.3 | 3.4 |
| Example 2.15 | Example 1.10 | 53.2 | 3.3 |
| Comparative C6 | — | 49.9 | — |

TABLE 2.9

Master Paint #1

| Aqueous Composition | Multistage Polymer Particle | Y-reflectance | Delta Y | 20° gloss |
|---|---|---|---|---|
| Example 2.16 | Example 1.15 | 52.6 | 7.05 | 28.2 |
| Comparative C7 | — | 45.55 | — | 15.1 |

TABLE 2.10

Master Paint #1

| Aqueous Composition | Multistage Polymer Particle | Y-reflectance | Delta Y | 20° gloss |
|---|---|---|---|---|
| Example 2.17 | Example 1.8 | 52.5 | 6.6 | 43 |
| Comparative C8 | — | 45.9 | — | 24.6 |

TABLE 2.11

Master Paint #1

| Aqueous Composition | Multistage Polymer Particle | Y-reflectance | Delta Y | 20° gloss |
|---|---|---|---|---|
| Example 2.18 | Example 1.9 | 52.75 | 5.65 | 38.7 |
| Comparative C9 | — | 47.1 | — | 28.4 |

TABLE 2.12

Master Paint #1

| Aqueous Composition | Multistage Polymer Particle | Y-reflectance | Delta Y | 20° gloss |
|---|---|---|---|---|
| Example 2.19 | Example 1.11 | 52.9 | 3.95 | 32.5 |
| Example 2.20 | Example 1.28 | 52.7 | 3.75 | 21.3 |
| Comparative C10 | — | 48.95 | — | 22.1 |

TABLE 2.13

Master Paint #1

| Aqueous Composition | Multistage Polymer Particle | Y-reflectance | Delta Y | 20° gloss |
|---|---|---|---|---|
| Example 2.21 | Example 1.22 | 53.65 | 5.15 | 29.6 |
| Comparative C11 | — | 48.5 | — | 34.4 |

TABLE 2.14

Master Paint #1

| Aqueous Composition | Multistage Polymer Particle | Y-reflectance | Delta Y | 20° gloss |
|---|---|---|---|---|
| Example 2.22 | Example 1.30 | 52.5 | 3.55 | 35.7 |
| Comparative C12 | — | 48.95 | — | 23.8 |

TABLE 2.15

Master Paint #2

| Aqueous Composition | Multistage Polymer Particle | Y-reflectance | Delta Y |
|---|---|---|---|
| Example 2.23 | Example 1.23 | 65.25 | 2.8 |
| Comparative D1 | — | 62.45 | — |

TABLE 2.16

Master Paint #2

| Aqueous Composition | Multistage Polymer Particle | Y-reflectance | Delta Y |
|---|---|---|---|
| Example 2.24 | Example 1.24 | 63.75 | 2.2 |
| Comparative D2 | — | 61.55 | — |

TABLE 2.17

Master Paint #3

| Aqueous Composition | Multistage Polymer Particle | Y-reflectance | Delta Y |
|---|---|---|---|
| Example 2.25 | Example 1.26 | 51.4 | 6 |
| Comparative E | — | 45.4 | — |

The results in Tables 2.3 to 2.17 show that dried coating prepared from the aqueous compositions of Examples 2.1 to 2.25, which contained multistage polymer particles having select absorbing groups, had increased levels of hiding compared to the comparative dried coatings, which did not contain composite particles having multistage polymer particles. Further, the dried coatings prepared from the aqueous coating compositions of this invention had higher levels of gloss than the comparative coatings.

TABLE 2.18

Master Paint #1

| Aqueous Composition | Multistage Polymer Particle | Y-reflectance | Delta Y | 20° gloss | Scrub Ratio |
|---|---|---|---|---|---|
| Example 2.26 | Example 1.29 | 51.7 | 1.1 | 28.9 | 0.59 |
| Comparative C13 | — | 50.6 | — | 23.6 | 1 |

TABLE 2.19

Master Paint #1

| Aqueous Composition | Polymer Particle | Y-reflectance | Delta Y | 20° gloss | Scrub Ratio |
|---|---|---|---|---|---|
| Comparative A1 | Comparative A | 54.5 | 6.8 | 13.8 | 0.22 |
| Comparative C14 | — | 47.7 | — | 39.5 | 1 |

TABLE 2.20

Master Paint #1

| Aqueous Composition | Polymer Particle | Y-reflectance | Delta Y |
|---|---|---|---|
| Comparative B1 | Comparative B | 49.6 | −0.1 |
| Comparative C15 | — | 49.7 | — |

The results in Tables 2.18 to 2.20 show that the dried coating prepared from the aqueous composition of this invention, which contains composite particles having multistage polymer particles, as exemplified by Example 2.26, provided a combination of improved hiding, as indicated by a delta Y value of 1.1; an increase in 20° gloss; and an acceptable level of scrub resistance, which indicated good film formation and properties. In contrast, the comparative dried coating prepared from the comparative aqueous composition, Comparative A1, which contained comparative composite particles having comparative single stage polymer particles with a glass transition temperature of 54° C. had improved hiding but did not provided increase gloss and had an unacceptable level of scrub resistance. Also, the comparative dried coating prepared from the comparative aqueous composition, Comparative B1, which contained comparative composite particles having comparative single stage polymer particles with a glass transition temperature of 21° C., did not provide increase hiding. Further, the comparative aqueous composition of Comparative B1 had poor aqueous stability as evidenced by significant thickening of the comparative aqueous composition after sitting for a period of greater than 12 hours.

EXAMPLE 3

Preparation of Composite Particles with Various Levels of Absorbed Multistage Polymer Particles Aqueous compositions containing the composite particles were prepared with various levels of absorbed multistage polymer particles by combining the ingredients listed in Tables 3.1 and 3.2 with stirring. The aqueous compositions were placed on roller and allowed to mix overnight. Dried coated samples were prepared by applying a 76 micron (3 mil) thick wet film of the aqueous compositions onto Opacity Charts (The Leneta Company, Form 3B) with a Bird blade (MED Industries) and allowing the wet film to dry at 20° C. and 20% relative humidity for 4 to 6 hours before measuring Y-reflectance values

TABLE 3.1

| | |
|---|---|
| Multistage Polymer Particle | X1 |
| Rhoplex ™ AC-261 binder | X2 |
| Water | X3 |
| Ti-Pure ™ R-746 titanium dioxide slurry | 41.9 g |
| Texanol ™ coalescent | X4 |
| Colloid 643 | 0.04 |
| Supronil HK Black Liquid (25% in water) | 2.00 g |
| Natrosol ™ 250 HR thickener (2.5% in water) | 15.00 g |

TABLE 3.2

| Multistage Polymer Particle | Wt. % Multistage Polymer Particle based on $TiO_2$ | X1 (g) | X2 (g) | X3 (g) | X4 (g) |
|---|---|---|---|---|---|
| Example 1.20 | 10 | 8.74 | 88.84 | 33.05 | 7.14 |
| Example 1.20 | 30 | 26.21 | 76.02 | 28.47 | 7.14 |
| Example 1.20 | 60 | 52.42 | 56.79 | 21.59 | 7.13 |
| Example 1.20 | 100 | 87.36 | 31.15 | 12.43 | 7.12 |
| Example 1.20 | 146 | 128.27 | 1.13 | 1.7 | 7.11 |
| Example 1.21 | 10 | 8.74 | 88.84 | 33.05 | 7.14 |
| Example 1.21 | 30 | 26.21 | 76.02 | 28.47 | 7.14 |
| Example 1.21 | 60 | 52.42 | 56.79 | 21.59 | 7.13 |
| Example 1.21 | 100 | 87.36 | 31.15 | 12.43 | 7.12 |
| Example 1.21 | 146 | 128.27 | 1.13 | 1.7 | 7.11 |
| Example 1.18 | 10 | 8.86 | 88.84 | 32.93 | 7.14 |
| Example 1.18 | 30 | 26.57 | 76.02 | 28.12 | 7.14 |
| Example 1.18 | 60 | 53.15 | 56.76 | 20.90 | 7.13 |
| Example 1.18 | 100 | 88.58 | 31.15 | 11.28 | 7.12 |
| Example 1.18 | 146 | 130.05 | 1.13 | .01 | 7.11 |
| Example 1.19 | 10 | 8.81 | 88.84 | 32.98 | 7.14 |
| Example 1.19 | 30 | 26.43 | 76.02 | 28.26 | 7.14 |
| Example 1.19 | 60 | 52.86 | 56.76 | 21.18 | 7.13 |
| Example 1.19 | 100 | 88.09 | 31.15 | 11.74 | 7.12 |
| Example 1.19 | 146 | 129.34 | 1.13 | .69 | 7.11 |
| Example 1.17 | 10 | 8.78 | 88.84 | 33.0 | 7.14 |
| Example 1.17 | 30 | 26.36 | 76.02 | 28.33 | 7.14 |
| Example 1.17 | 60 | 52.71 | 56.79 | 21.32 | 7.13 |
| Example 1.17 | 100 | 87.85 | 31.15 | 11.97 | 7.12 |
| Example 1.17 | 146 | 128.98 | 1.13 | 1.03 | 7.11 |
| Example 1.16 | 10 | 8.74 | 88.84 | 33.05 | 7.14 |
| Example 1.16 | 30 | 26.21 | 76.02 | 28.47 | 7.14 |
| Example 1.16 | 60 | 52.42 | 56.79 | 21.59 | 7.13 |
| Example 1.16 | 100 | 97.36 | 31.15 | 12.43 | 7.12 |
| Example 1.16 | 146 | 128.27 | 1.13 | 1.7 | 7.11 |

The comparative aqueous composition, Comparative F, was prepared without multistage polymer particles according to the composition in Table 3.1 using 92.25 g binder (X2), 38.85 g water (X3), and 3.81 g coalescent (X4). The dried comparative coating prepared from the comparative aqueous composition had a Y-reflectance value of 54.9. Table 3.3 shows the delta Y-reflectance values for the dried films prepared from the aqueous compositions of Tables 3.1 and 3.2.

TABLE 3.3

Delta Y-Reflectance Values

| % Multistage Polymer Particle Based on TiO$_2$ | Example 1.21 | Example 1.17 | Example 1.16 | Example 1.18 | Example 1.19 | Example 1.20 |
|---|---|---|---|---|---|---|
| 10 | −0.95 | −1.1 | −2.75 | −7 | −8.7 | −8.6 |
| 30 | 0.5 | 0.55 | 0.8 | −8.6 | −7.1 | −4.8 |
| 60 | 1.6 | 1.55 | 1.85 | 2.15 | 2.1 | 1.75 |
| 100 | 1 | 1.7 | 1.7 | 2.6 | 2.4 | 2.5 |
| 146 | 2.7 | 3.2 | 3.9 | 4.45 | 4.4 | 3.4 |
| Ratio of 1$^{st}$ Polymer to 2$^{nd}$ Polymer | 1/14 | 1/12 | 1/10 | 1/8 | 1/6 | 1/4 |

The results in Table 3.3 show that the composite particles containing multistage polymer particles having ratios of first polymer to second polymer in the range of 1:14 to 1:10 provided increased hiding in dried coatings, even at levels of 30% multistage polymer particles, based on titanium dioxide. At levels of 60% and greater, composite particles formed from multistage polymer particles having ratios of first polymer to second polymer in the range of 1:14 to 1:4 provided increased hiding in dried films.

EXAMPLE 4

Preparation of Polymer Particles Having Phosphorus Acid Full-Ester Groups

Preparation of Diethyl Ester of Phosphoethyl Methacrylate

Preparation #1: A 250 milliliter (ml) round bottom flask was purged with dry nitrogen. To the flask was added 50.0 g hydroxyethyl methacrylate, 0.25 g of a 5 weight % solution of 4-hydroxy-2,2,6,6-tetramethyl-piperidinooxy, free radical in propylene glycol methyl ether acetate, and 10.0 g anhydrous diethyl ether. The contents of the flask was heated and maintained at 75° C. for 30 minutes while a stream of dry nitrogen gas was passed though the flask. Next, the contents of the flask was cooled to room temperature, and 68.0 g of diethylchlorophosphate was added. This was followed by the dropwise addition of 31.5 g anhydrous pyridine with stirring over a period of 1 hour, while maintaining the contents of the flask at a temperature below 40° C. The contents of the flask was allowed to sit for 3 hours. The diethyl ester of phosphoethyl methacrylate was extracted by combining the contents of the flask with a mixture of 15 g of 10 weight % sodium hydroxide solution, 140 g butyl acetate, and 185 g deionized water. The top organic phase yielded 245 g of a 43 weight % solution of the diethyl ester of phosphoethyl methacrylate in butyl acetate.

Preparation #2: A 250 milliliter (ml) round bottom flask was purged with dry nitrogen. To the flask was added 30.1 g hydroxyethyl methacrylate and 50.0 g diethylchlorophosphate. Next, 27.0 g triethylamine was added dropwise with stirring over a period of 20 minutes. The contents of the flask was allowed to sit for at least 12 hours. The diethyl ester of phosphoethyl methacrylate was extracted by combining the contents of the flask with a mixture of 39 g BA and 150 g deionized water. The top organic phase yielded 65.4 g of a 40 weight % solution of the diethyl ester of phosphoethyl methacrylate in BA.

Preparation of Polymer Particles Containing Phosphorus Acid Full-Ester Groups

Aqueous dispersions containing the polymer particles having phosphorus acid full-ester groups were prepared in a 1-liter, four necked round bottom flask equipped with a paddle stirrer, a thermometer, a nitrogen inlet, and a reflux condenser.

EXAMPLE 4.1

To the flask was added 220 g deionized water. The contents of the flask was heated to 85° C. under a nitrogen atmosphere. A monomer emulsion (ME-1), which was prepared by mixing 6 g deionized water, 0.4 g surfactant-A, 4.5 g BA, 3.6 g MMA, 0.18 g ALMA, 0.72 g MAA, and 9.0 g diethyl ester of phosphoethyl methacrylate (Preparation #2 at 40 weight % solids) was added to the flask. This was followed by the addition of a solution containing 0.72 g sodium persulfate in 4 g deionized water. The contents of the flask was maintained at a temperature of 85° C. for a period of 10 minutes. Next, a second monomer emulsion (ME-2), which was prepared by mixing 40 g deionized water, 6.0 g surfactant-A, 70.5 g 2-EHA, 88.2 g MMA, and 3.3 g MAA, was added to the kettle at a rate of 2 g/minute along with a separate cofeed of a solution containing 0.20 g sodium persulfate in 18 g deionized water, while maintaining the contents of the flask at a temperature of 85° C. After the complete addition of ME-2 and the sodium persulfate solution, the contents of the flask was maintained at a temperature of 85° C. for 15 minutes, and then cooled to room temperature. Next, 3 g ammonium hydroxide was added and the contents of the flask was filtered to remove any coagulum. The resulting dispersion, Example 4.1, had a solids content of 36.5 weight %, an average particle diameter of 152 nm, and a pH of 8.5.

EXAMPLE 4.2

To the flask was added 220 g deionized water. The contents of the flask was heated to 85° C. under a nitrogen atmosphere. A monomer emulsion (ME-1), which was prepared by mixing 6 g deionized water, 0.8 g surfactant-A, 7.2 g BA, 5.4 g MMA, 0.18 g ALMA, 0.72 g MAA, and 4.5 g Preparation #2 (at 40 weight % solids), was added to the flask. This was followed by the addition of a solution containing 0.72 g sodium persulfate in 4 g deionized water. The contents of the flask was maintained at a temperature of 85° C. for a period of 10 minutes. Next, a second monomer emulsion (ME-2), which was prepared by mixing 40 g deionized water, 5.2 g surfactant-A, 70.5 g 2-EHA, 88.2 g MMA, and 3.3 g MAA, was added to the flask at a rate of 2 g/minute along with a separate cofeed of a solution of 0.20 g sodium persulfate in 18 g deionized water, while maintaining the contents of the flask at a temperature of 85° C. After the complete addition of ME-2 and the sodium persulfate solution, the contents of the flask was maintained at a temperature of 85° C. for 15 minutes, and then cooled to room temperature. Next, 3 g ammonium hydroxide was added and the contents of the flask was filtered to remove any coagulum. The resulting dispersion, Example 4.2, had a solids content of 36.0 weigh %, an average particle diameter of 109 nm, and a pH of 8.3.

EXAMPLE 5

Composite Particles Containing Polymer Particles Having Phosphorus Acid Full-Ester Groups For each experiment, a master paint containing everything except the titanium dioxide and the polymer particles having phosphorus acid full-ester groups was made. A composite was made by placing a given amount of polymer particles having full-ester groups into a container, adding sufficient water to adjust the solids to 33.0 weight %, then adding 40.73 g of Ti-Pure™ R-746 titanium dioxide while stirring. The amount of polymer particles having phosphorus acid full-ester groups used was the amount required for the composite to have 60 weight % absorbed polymer particles based on weight of titanium dioxide particles. The aqueous compositions were made by combining 50.23 g of the aqueous dispersion containing the composite particles with 39.09 g of the master paint and placing the resulting aqueous compositions on a roller overnight. For comparative aqueous composition, which did not contain absorbing polymer particles, the aqueous dispersion containing the titanium dioxide particles was made with the binder used in the master paint. The aqueous compositions were cast on Lenetta charts with a 76 micron bird bar and dried at room temperature and 20% relative humidity for 4 to 6 hrs before measuring Y-reflectance and gloss.

TABLE 5.1

Master paint #4

| | |
|---|---|
| Rhoplex ™ AC-261 binder | 1262.04 |
| water | 185.88 |
| Texanol ™ coalescent | 106.26 |
| Natrosol ™ 250 HR thickener (2.5% in water) | 166.32 |
| Colortrend ™ 8807 black pigment | 41.96 |

TABLE 5.2

| Aqueous Composition | Polymer Particles Having Phosphorus Acid Full-Ester Groups | Y-reflectance | Delta Y |
|---|---|---|---|
| Example 5.1 | Example 4.1 | 48.55 | 0.95 |
| Example 5.2 | Example 4.2 | 48.8 | 1.2 |
| Comparative G | — | 47.6 | |

The results in Table 5.2 show that the dried coating prepared from the aqueous compositions containing composite particles having polymer particles with phosphorus acid full-ester groups had increased hiding compared the comparative coating, which did not contain composite particles.

EXAMPLE 6

Preparation of Multistage Polymer Particles Containing First Polymer Having Complementary Functional Group To a 5-liter flask is added 1100 g deionized water. The contents of the flask is heated to 85° C. under a nitrogen atmosphere. A solution of 3.0 g sodium carbonate in 30 g deionized water is added to the flask. Next, a monomer emulsion (ME-1), which is prepared by mixing 30 g deionized water, 6.0 g surfactant-A, 49.5 g BA, 29.7 g MMA, 0.90 g ALMA, 0.9 g MAA, and 9.0 g 3-isopropenyl-α,α-dimethylbenzyl isocyanate (TMI), is added to the kettle and is followed by the addition of a solution of 3.6 g sodium persulfate in 20 g deionized water. The contents of the flask is maintained at a temperature of 85° C. for 15 minutes. Next, a second monomer emulsion (ME-2), which is prepared by mixing 200 g deionized water, 26 g surfactant-A, 360.5 g 2-EHA, 441.4 g MMA, and 8.1 g MAA, is added to the kettle at a rate of 5 grams/minute along with the coaddition of a solution containing 1.0 g sodium persulfate in 90 g deionized water, while contents of the flask is maintained at a temperature of 85° C. After 20 minutes the feed rate of ME-2 is increased to 10 grams/minute until the addition of ME-2 is complete. After the complete addition of ME-2 and the sodium persulfate solution, the contents of the flask is maintained at a temperature of 85° C. for 15 minutes. Next, the contents of the flask is cooled to room temperature and filtered to remove any coagulum. The resulting dispersion, Example 6.1, has a solids content of 36.0 weight %, an average particle diameter of 130 nm, and a pH of 5.5. The glass transition temperatures of the first polymer and the second polymer are 25° C. and 18° C., respectively. The ratio of the first polymer to the second polymer is 1 to 9. The first polymer contains isocyanate groups as the complementary functional group.

EXAMPLE 7

Preparation of Covalently Bonded Composite Particle Containing Multistage Polymer Particles Preparation of Functionalized Pigment Particles The titanium dioxide particles functionalized with amine groups are prepared by treating titanium dioxide particles with a coupling agent containing alkoxysilane groups as the first functional group and an amine group as the second functional group. The alkoxysilane groups are reacted with the titanium dioxide particles to attach the coupling agent to the titanium dioxide particles with covalent bonds.

A mixture of 95 g ethanol and 5 g water is placed in a grind pot which is then placed on a Premier Mill dispersator (manufactured by Premier Mill Corp., Reading, Pa.) equipped with a disk blade. To the grind pot, 400 g TiPure™ R-706 titanium dioxide (TiPure is a trademark of E. I. DuPont de Nemours and Company, Wilmington, Del.) is added with mixing. Next, the mixture is ground at 2000 rpm for a period of 15 minutes to disperse the titanium dioxide particles. The mill speed is decreased to gentle stirring, and 4 g of 3-aminopropyltrimethoxysilane is added. The mixture is stirred for 1 hour. Next, the mixture is transferred to a plastic bucket and the ethanol and water are allowed to evaporate at room temperature to provide titanium dioxide particles functionalized with amine groups as the functionalized pigment particles.

The functionalized titanium dioxide particles is provided as an aqueous dispersion by first adding 75.0 g of water to a grind pot. Next, 300 g of the functionalized titanium dioxide particles is added to the grind pot with mixing using a Premier Mill dispersator equipped with a disk blade and ground at 2000 rpm for 20 minutes to provide the aqueous dispersion containing functionalized titanium dioxide particles.

Covalently bonded composite particles are prepared by adding dropwise 140 g of the aqueous dispersion containing the functionalized titanium dioxide particles, to 192.5 g of the aqueous dispersion of Example 6.1, with mixing. The resulting composite particle dispersion is placed on a roller for at least 12 hours. The final composite particle dispersion has a solids level of 54.5 weight %. The composite particles contains 61.5 weight % titanium dioxide particles and 38.5 weight % multistage polymer particles containing first polymer having reacted isocyanate groups.

What is claimed is:

1. A polymer composition comprising multistage polymer particles;
   wherein each of said multistage polymer particles comprises:
   a) a first polymer comprising:
   i) a polymerized unit of a multiethylenically unsaturated monomer, and
   ii) at least one pendant absorbing group selected from the group consisting of phosphorus acid groups, phosphorus acid full-ester groups, polyacid sidechain groups, and mixtures thereof,
   wherein said first polymer has a glass transition temperature in the range of from −60° C. to 35° C.; and
   b) a second polymer having a glass transition temperature in the range of from −60° C. to 35° C., wherein said second polymer is substantially free of said at least one pendant absorbing group;
   wherein the average weight ratio of said first polymer to said second polymer is in the range of from 1:2 to 1:20.

2. A composite particle comprising:
   a) an inorganic particle having a surface; and
   b) a plurality of multistage polymer particles attached to said surface of said inorganic particle, each of said multistage polymer particles comprising:
   i) a first polymer comprising: a polymerized unit of a multiethylenically unsaturated monomer, and at least one pendant absorbing group selected from the group consisting of phosphorus acid groups, phosphorus acid full-ester groups, polyacid sidechain groups, and mixtures thereof, wherein said first polymer has a glass transition temperature in the range of from −60° C. to 35° C.; and
   ii) a second polymer having a glass transition temperature in the range of from −60° C. to 35° C., wherein said second polymer is substantially free of said at least one pendant absorbing group;
   wherein the average weight ratio of said first polymer to said second polymer is in the range of from 1:2 to 1:20.

3. An aqueous composition, useful for preparing a dried coating, comprising:
   a) a composite particle comprising:
   i) an inorganic particle having a surface; and
   ii) a plurality of multistage polymer particles absorbed on said surface of said inorganic particle, each of said multistage polymer particles comprising:
   a first polymer comprising: a polymerized unit of a multiethylenically unsaturated monomer, and at least one pendant absorbing group selected from the group consisting of phosphorus acid groups, phosphorus acid full-ester groups, polyacid sidechain groups, and mixtures thereof, wherein said first polymer has a glass transition temperature in the range of from −60° C. to 35° C.; and
   a second polymer having a glass transition temperature in the range of from −60° C. to 35° C.; wherein said second polymer is substantially free of said at least one pendant absorbing group;
   wherein the average weight ratio of said first polymer to said second polymer is in the range of from 1:2 to 1:20; and
   b) a binder.

4. The aqueous composition according to claim 3 having a volatile organic compound level of less than 50 grain per liter of said aqueous composition.

5. A multistage polymer particle comprising:
   a) a first polymer comprising:
   i) a polymerized unit of a multiethylenically unsaturated monomer, and
   ii) at least one complementary functional group,
   wherein said first polymer has a glass transition temperature in the range of from −60° C. to 120° C.; and
   b) a second polymer having a glass transition temperature in the range of from −60° C. to 35° C., wherein said second polymer is substantially free of said at least one complementary functional group;
   wherein the average weight ratio of said first polymer to said second polymer is in the range of from 1:2 to 1:20.

6. A covalently bonded composite particle comprising:
   a) a pigment particle;
   b) a first plurality of reacted coupling agents, such that each one of said reacted coupling agents forms a first covalent bond with said pigment particle; and
   c) a second plurality of multistage polymer particles, each of said multistage polymer particles comprising:
   i) a first polymer comprising:
   a polymerized unit of a multiethylenically unsaturated monomer, and
   a complementary functional group reacted to form a second covalent bond with a corresponding one of said first plurality of reacted coupling agents;
   wherein said first polymer has a glass transition temperature in the range of from −60° C. to 120° C.; and
   ii) a second polymer having a glass transition temperature in the range of from −60° C. to 35° C.; wherein said second polymer is substantially free of said reacted complementary functional group; and
   wherein the average weight ratio of said first polymer to said second polymer is in the range of from 1:2 to 1:20.

7. An aqueous composition, useful for preparing a dried coating, comprising:
   a) a covalently bonded composite particle comprising:
   i) a pigment particle;
   ii) a first plurality of reacted coupling agents, such that each one of said reacted coupling agents forms a first covalent bond to said pigment particle; and
   iii) a second plurality of multistage polymer particles, each of said multistage polymer particles comprising:
   a first polymer comprising a polymerized unit of a multiethylenically unsaturated monomer, and a complementary functional group reacted to form a second covalent bond with a corresponding one of said first plurality of reacted coupling agents; wherein said first polymer has a glass transition temperature in the range of from −60° C. to 120° C.; and a second polymer having a glass transition temperature in the range of from −60° C. to 35° C.; wherein said second polymer is substantially free of said reacted complementary functional group;

wherein the average weight ratio of said first polymer to said second polymer is in the range of from 1:2 to 1:20; and b) a binder.

8. The aqueous composition according to claim 7 having a volatile organic compound level of less than 50 gram per liter of said aqueous composition.

9. A composite particle comprising:
a) an inorganic particle having a surface; and
b) a plurality of polymer particles absorbed on said surface of said inorganic particle, each of said polymer particles having a pendant phosphorus acid full-ester group.

* * * * *